(12) United States Patent
Yamasaki

(10) Patent No.: US 7,961,233 B2
(45) Date of Patent: Jun. 14, 2011

(54) ELECTRONIC BLURRING COMPENSATION DEVICE AND ELECTRONIC BLURRING COMPENSATION METHOD

(75) Inventor: Masafumi Yamasaki, Hachioji (JP)

(73) Assignees: Olympus Corporation, Tokyo (JP); Olympus Imaging Corp., Tokyo (JP)

( * ) Notice: Subject to any disclaimer, the term of this patent is extended or adjusted under 35 U.S.C. 154(b) by 527 days.

(21) Appl. No.: 11/655,592

(22) Filed: Jan. 19, 2007

(65) Prior Publication Data

US 2007/0195180 A1    Aug. 23, 2007

(30) Foreign Application Priority Data

Feb. 23, 2006 (JP) .................................. 2006-047365

(51) Int. Cl.
  *H04N 9/64* (2006.01)
  *H04N 5/228* (2006.01)
(52) U.S. Cl. ................... 348/248; 348/208.1; 348/208.5
(58) Field of Classification Search .......... 348/246–250, 348/208.99–208.13, 362
See application file for complete search history.

(56) References Cited

U.S. PATENT DOCUMENTS

| | | | |
|---|---|---|---|
| 6,778,210 B1 * | 8/2004 | Sugahara et al. | 348/208.4 |
| 7,239,342 B2 * | 7/2007 | Kingetsu et al. | 348/208.4 |
| 7,333,132 B2 * | 2/2008 | Shimizu et al. | 348/208.1 |
| 7,424,213 B2 * | 9/2008 | Imada | 396/55 |
| 7,432,953 B2 * | 10/2008 | Washisu | 348/208.5 |
| 7,463,284 B2 * | 12/2008 | Tamamura | 348/208.1 |
| 7,525,572 B2 * | 4/2009 | Katoh et al. | 348/208.2 |
| 7,545,408 B2 * | 6/2009 | Nomura et al. | 348/208.1 |
| 7,548,659 B2 * | 6/2009 | Ofek et al. | 382/254 |
| 7,636,486 B2 * | 12/2009 | Steinberg et al. | 382/255 |

FOREIGN PATENT DOCUMENTS

| | | | |
|---|---|---|---|
| JP | 2001-045359 | | 2/2001 |
| JP | 2005-198148 | | 7/2002 |
| JP | 2003-101862 | | 4/2003 |
| JP | 2005-198148 | * | 9/2004 |
| JP | 2005-354477 A | * | 11/2004 |
| JP | 2005-079841 | | 3/2005 |
| JP | 2005-354477 | | 12/2005 |

OTHER PUBLICATIONS

Chinese Office Action for Chinese Patent Application No. 200710078861.1, mailed on May 16, 2008 (5 pgs.) (with English Translation (6 pgs.)).
Office Action for Japanese Patent Application No. 2006-047365, mailed Sep. 21, 2010 (2 pgs.).

* cited by examiner

*Primary Examiner* — Jason Chan
*Assistant Examiner* — Pritham Prabhakher
(74) *Attorney, Agent, or Firm* — John C. Pokotylo; Straub & Pokotylo

(57) ABSTRACT

The present invention provides an electronic blurring compensation device applied to a digital camera that includes an angular rate sensor for detecting blurring of an image, an solid-state image pickup element for shooting continuously over time a plurality of images, compensating mutual blurring of the plurality of shot images in accordance with the amount of blurring detected by the angular rate sensor, and generating one image by synthesizing the plurality of compensated images, and a CPU for controlling the number of continuous shootings by the solid-state image pickup element such that the total amount of blurring over the plurality of continuously shot images falls within a previously set predetermined value.

4 Claims, 11 Drawing Sheets

ELECTRONIC BLURRING COMPENSATION DEVICE AND ELECTRONIC BLURRING COMPENSATION METHOD

CROSS REFERENCES TO RELATED APPLICATIONS

This application claims benefit of Japanese Application No. 2006-047365 filed in Japan on Feb. 23, 2006, the contents of which are incorporated by this reference.

BACKGROUND OF THE INVENTION

1. Field of the Invention

The present invention relates to an electronic blurring compensation device for electronically compensating blurring of a shot image.

2. Description of the Related Art

A large number of image pickup devices for picking up still images and motion images while using a solid-state image pickup element are structured to be shot by grasping with hand. In such image pickup devices, for example, when the luminance of a subject is low, the shutter speed becomes slow, and it is known that blurring of images due to hand movement may easily occur. It is also known that due to vibration during a drive, a camera mounted to a car or the like, blurring of images may similarly occur.

Various technologies for compensating such blurring are proposed up to now and example of which include an optical blurring compensation for shifting an optical system in accordance with vibration, a sensor shift blurring compensation for shifting an solid-state image pickup element in accordance with vibration, and an electronic blurring compensation for compensating blurring by performing a processing on a picked up image.

Among these electronic blurring compensation techniques, one corresponds to motion images for keeping the position of a subject in the images by differing image cutup positions in accordance to blurring, but this technique cannot be applied to still images because the technique is not designed for avoiding blurring of an image in one frame.

On the other hand, various electronic blurring compensation techniques that can be applied to still images are also proposed.

For example, Japanese Unexamined Patent Application Publication No. 2001-45359 describes an image pickup device for subsequently reading out a plurality of images from an image pick up element, storing the images in an image memory, and thereafter compensating mutual blurring among these plural images to synthesize the images, thereby generating an image in which the blurring has been compensated.

In addition, Japanese Unexamined Patent Application Publication No. 2005-198148 describes a solid-state image pickup element including a charge transfer section for horizontally and vertically transferring an image into an image pickup element, in which relative blurring between a picked up first image and a second image that has been transferred to the charge transfer section is compensated and the first image and the second image are synthesized to each other, thereby generating an image in which the blurring has been compensated.

The technique described in each of the above-mentioned publications is aimed at obtaining one image by performing the synthesis after adjusting the relative positions of the plurality of images. Incidentally, when one synthesized image is generated by compensating mutual blurring among n images (n is a positive integer) which are shot in a time-division manner, an area whose number of images synthesized does not reach n is developed at an end portion of the generated synthesized image. Such area whose number of images synthesized does not reach n has gradually smaller luminance as compared with the area where n images are synthesized one another, so it is necessary to cut and remove the area or perform a compensation process on the area. This area whose number of images synthesized does not reach n is narrow enough to ignore as compared with the size of the whole image in a usual case, and the compensation requires a complicated process. Thus, adoption of the cut and removal method is simple and practical. However, for a device to be used by a large number of general users such as a camera, blurring becomes extremely large in accordance with a skill of a photographer, and it is also considerable that the effective image area may be unacceptably narrow.

SUMMARY OF THE INVENTION

According to an aspect of the present invention, it is an object to provide an electronic blurring compensation device with which blurring of an image can be compensated and an effective area of the image larger than a predetermined size can be secured without depending on a technique of a photographer.

In brief, according to the present invention, an electronic blurring compensation device includes: a shooting section for continuously shooting a plural images; a detection section for detecting blurring of the images; a number-of-shooting control section for controlling the number of continuous shootings such that a total amount of blurring over of a predetermined number of continuous images among the plurality of the continuously shot images falls within a previously set predetermined value; a blurring compensation section for compensating mutual blurring of the plurality of images shot by the predetermined times on the basis of the control of number-of-shooting control section; and an image synthesize section for synthesizing the images compensated by the blurring compensation section.

The above and other objects, features and advantages of the invention will become more clearly understood from the following description referring to the accompanying drawings.

DESCRIPTION OF THE PREFERRED EMBODIMENTS

Before a detailed description will be given of embodiments, first of all, a principle for compensating blurring is now described in brief.

It is assumed that an appropriate exposure time (full exposure time) obtained by performing photometry on a subject is $1/15$ seconds, for example. Then, it is also assumed that blur occurs in this exposure time of $1/15$ seconds (shutter speed). On the other hand, when the exposure time (shutter speed) is $1/125$ seconds, no blurring occurs or blurring which has by any chance occurred is practically negligible. In such a case, the above-mentioned full exposure time of $1/15$ seconds is time-divided into the exposure time of $1/125$ seconds to perform the shooting eight times by way of the time-division shooting, and eight images obtained through this time-division shooting are synthesized (added), thereby obtaining one image in the appropriate exposure time of $1/15$ seconds. It should be noted that the blurring is not compensated by merely synthesizing the images obtained through this time-division shooting in the above-mentioned $1/125$ seconds, so blurring among the time-division images is mutually compensated before the synthesis. Then, an area where all of the time-division images are overlapped one another in this synthesized image functions as an effective area. However, if the blurring is too large, this effective area becomes narrow. In view of the above, in order that the effective area becomes not so narrow, when the amount of blurring is equal to or larger than a predetermined acceptable amount, an image exceeding this acceptable level is excluded from the synthesis target. Then, a signal level of the synthesized image obtained by even excluding one or more time-division images does not reach a predetermined level as it is and therefore in accordance with the number of time-division images excluded, that is, in accordance with the number of synthesized time-division images, the image is amplified to obtain an appropriate signal level.

According to a first embodiment to be described below, the above-mentioned blurring compensation and synthesis of time-division images are performed in the image pickup element at a high speed. Then, according to a second embodiment to be described below, the above-mentioned blurring compensation and synthesis of the time-division images are performed after the time-division images are read out from the image pickup element to be converted into digital signals.

Hereinafter, the embodiments of the present invention will be described with reference to the drawings.

First Embodiment

Figure 1:
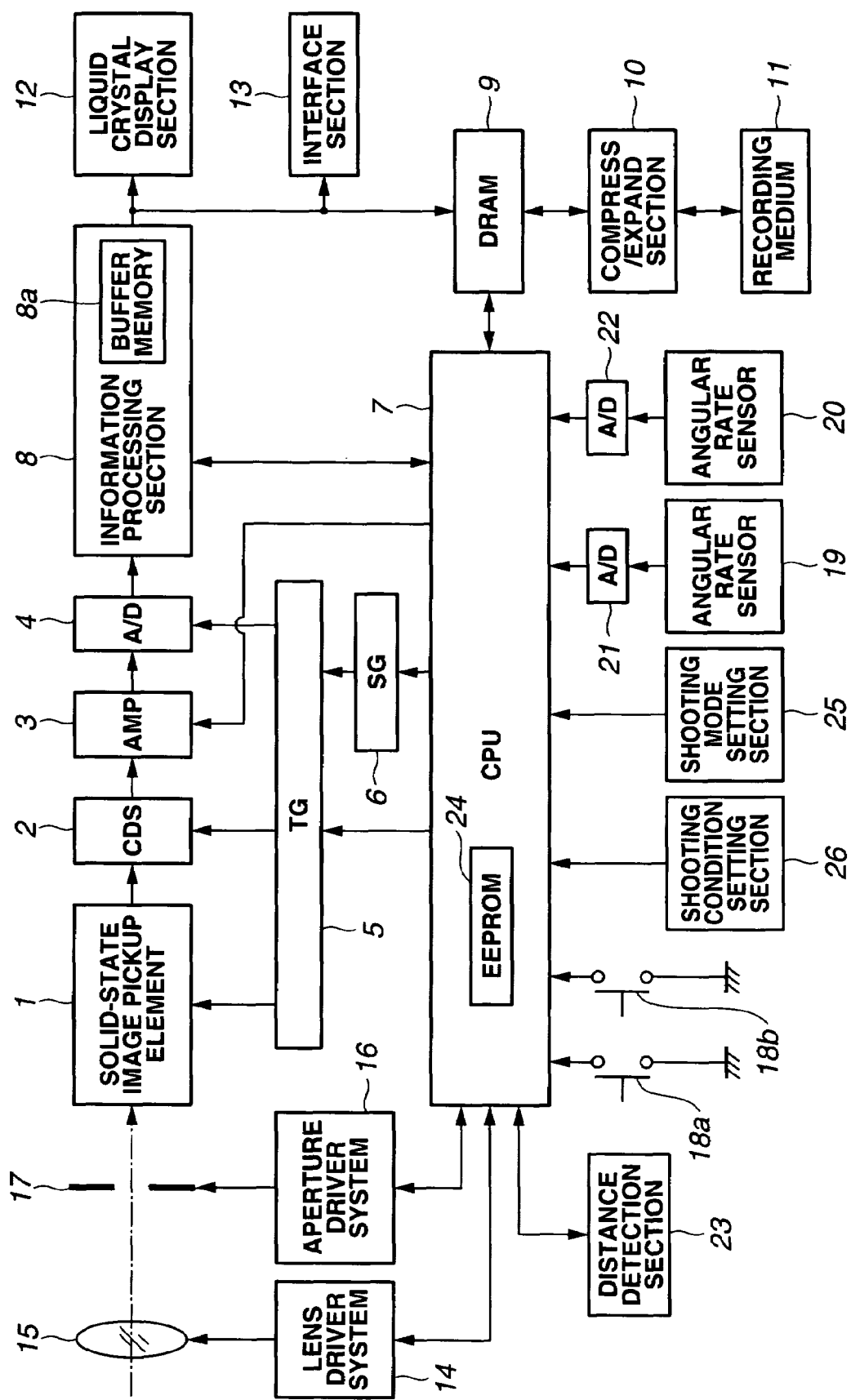
FIG. 1 is a block diagram of a main electric configuration of a digital camera according to a first embodiment of the present invention.

FIGS. 1 to 13 show a first embodiment of the present invention and FIG. 1 is a block diagram of a main electric configuration of a digital camera. According to this embodiment, an electronic blurring compensation device is applied to a digital camera.

This digital camera includes a solid-state image pickup element (hereinafter abbreviated as image pickup element when appropriate) 1, a correlated double sampling (CDS) circuit 2, a gain controller amplifier (AMP) 3, an A/D converter 4, a timing generator (TG) 5, a signal generator (SG) 6, a CPU 7, an information processing section 8, a DRAM 9, a compress/expand section 10, a recording medium 11, a liquid crystal display section 12, an interface section 13, a lens driver system 14, a shooting lens 15, an aperture driver system 16, an aperture 17, a first release switch 18a and a second release switch 18b, an angular rate sensor 19 and an angular rate sensor 20, an A/D converter 21 and an A/D converter 22, a distance detection section 23, an EEPROM 24 built in the CPU 7, a shooting mode setting section 25, and a shooting condition setting section 26.

The shooting lens 15 is an image pickup optical system for forming a subject image on an image pickup surface of the image pickup element 1 and structures a shooting section.

The aperture 17 is an optical aperture for performing light amount adjustment by regulating a passing range of image formation luminous flux from the shooting lens 15. The aperture 17 is a part of the image pickup optical system and structures the shooting section.

Figure 6:
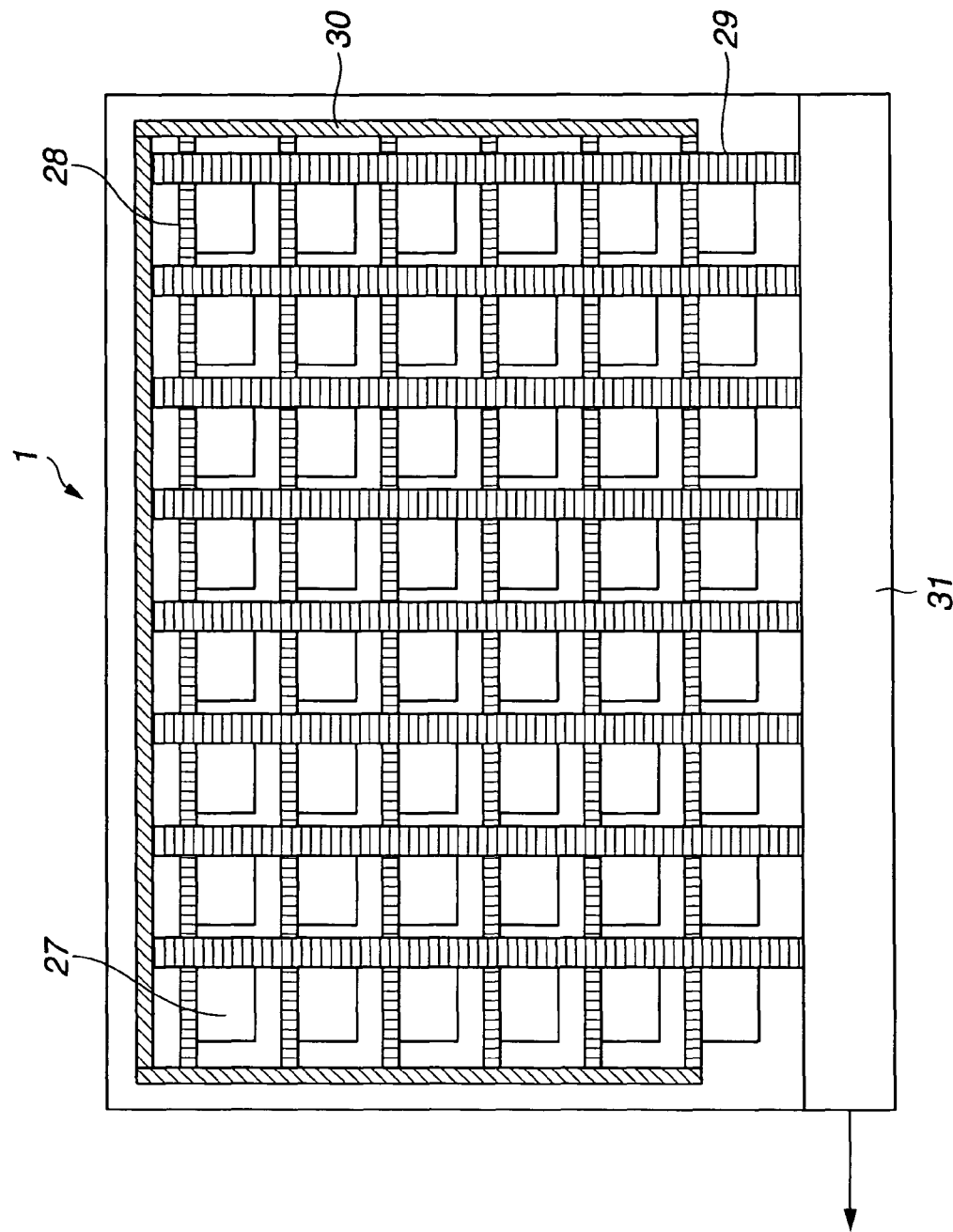
FIG. 6 shows a first configuration example of an image pickup element according to the first embodiment.
Figure 7:
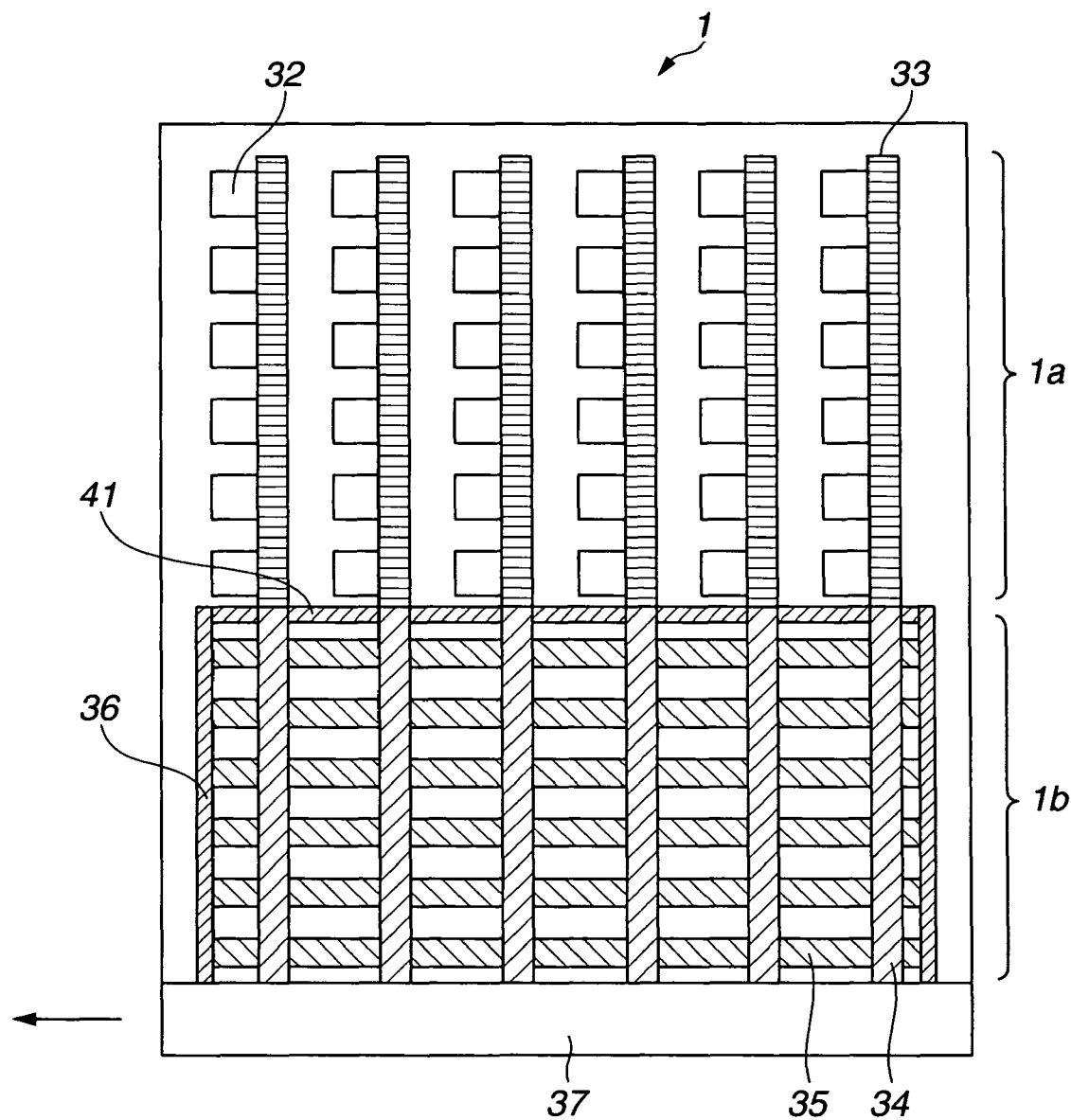
FIG. 7 shows a second configuration example of the image pickup element according to the first embodiment.

The image pickup element 1 is adapted to photoelectrically convert the subject image formed via the aperture 17 by the shooting lens 15 to be outputted as electric signals. The image pickup element 1 constructs the shooting section. Herein, FIG. 6 shows a first configuration example of the image pickup element 1 and FIG. 7 shows a second configuration example of the image pickup element 1. The image pickup elements 1 respectively shown in FIGS. 6 and 7 both have a larger number of photo diodes arranged in matrix, a horizontal transfer CCD or a vertical transfer CCD functioning as a first register for holding a first image generated by the photo diodes through exposure control at such a high speed that blurring can be tolerated, and a horizontal transfer CCD or a vertical transfer CCD functioning as a second register that is different from the first register for holding a second image shot after the first image. In each of the image pickup elements, in order that mutual blurring between the two images held in the first register and the second register is cancelled, such an operation will be repeatedly performed that after these two images are shifted in the first register and the second register, the two images are synthesized to each other, and this synthesized image is held at the first register or the second register, thereby generating the blurring compensated image in the image pickup element 1. The detailed configuration and action of the image pickup element 1 will be described later.

The TG 5 is adapted to supply a transfer pulse for driving the image pickup element 1 and constitutes a shooting section and a signal processing section.

The CDS 2 is driven in accordance with a sample hold pulse that is supplied from the TG 5 and performs correlated double sampling or the like on an image signal outputted from the image pickup element 1 to remove a reset noise therefrom. The CDS 2 constitutes the shooting section and the signal processing section.

The SG 6 is adapted to generate a synchronous signal on the basis of the control of the CPU 7 to be outputted to the TG 5. Also the SG 6 constitutes the shooting section and the signal processing section.

The gain controller amplifier (AMP) 3 is an amplification section for amplifying an analog signal outputted from the CDS 2. The gain controller amplifier also constitutes the shooting section and the signal processing section. An amplification gain of the gain controller amplifier (AMP) 3 is set to an amplification gain in accordance with an ISO (International Organization for Standardization) sensitivity Sv, in other words, the gain controller amplifier (AMP) 3 functions as an ISO sensitivity changing section. In addition, the amplification gain of the gain controller amplifier (AMP) 3 is used also in the case where the synthesized image is amplified for offsetting a shortage when the number of images obtained through this time-division shooting does not reach a regulated number.

The A/D converter 4 is an analog/digital converting section for converting an analog signal outputted from the gain controller amplifier (AMP) 3 in accordance with a signal supplied from the TG 5. The A/D converter 4 constitutes the shooting section and the signal processing section.

The information processing section 8 is adapted to generate image data by performing a process on a pixel signal outputted from the A/D converter 4. The information processing section 8 constitutes the shooting section, a blurring compensation section, an image synthesizing section, the signal processing section. The information processing section 8 includes an effective area extraction section having a function of extracting an image data in which blurring is appropriately compensated from image data outputted from the image pickup element 1. Furthermore, the information processing section 8 is configured to include a buffer memory 8a functioning as a memory section for temporarily storing the image data.

The DRAM 9 is adapted to temporarily store the image data outputted from the information processing section 8 and also temporarily store image data obtained by expanding compressed image data read out from the recording medium 11 by the compress/expand section 10. It should be noted that such a configuration may be adopted that the buffer memory 8a doubles as the function of the DRAM 9.

The compress/expand section 10 is adapted to compress the image data stored in the DRAM 9 and expand the compressed image data read out from the recording medium 11.

The recording medium 11 is a recording section for recording the image data compressed by the compress/expand section 10. For example, the recording medium 11 is made of a non-volatile recording medium.

The liquid crystal display section 12 is adapted to display the image data outputted from the information processing section 8 or the expanded image data outputted from the DRAM 9. The liquid crystal display section 12 doubles as a display section for displaying various warning messages and the like.

The interface section 13 is an interface including a terminal for transmitting and receiving data with an external device such as a monitor or a personal computer. Via the interface section 13, the image data or the like supplied from the information processing section 8 or the DRAM 9 can be outputted to the external device. In some cases, image data or the like can be taken in from the external device into the digital camera.

The lens driver system 14 is adapted to drive the shooting lens 15 to a focal position by receiving the instruction from the CPU 7 on the basis of an object distance detected by the distance detection section 23. The above-mentioned process is known as so-called auto-focus control. It should be noted herein that the auto-focus control is conducted on the basis of the output from the distance detection section 23, but such a structure may be adopted. The CPU 7 extracts high frequency components with use of a bypass filter from the luminance component of the image data for one frame (one screen) stored in the DRAM 9, an accumulated synthesized value of the extracted high frequency components is calculated or the like, an AF evaluation value corresponding to the contour component on the high frequency side or the like is calculated, and focal point detection is performed on the basis of the AF evaluation value.

The aperture driver system 16 is an aperture control section for driving the aperture 17 to change the opening diameter while the CPU 7 functioning as a photometry section performs exposure calculation on the basis of the image data stored in the DRAM 9 and receives an instruction based on the result from the CPU 7. Such a process is known as so-called AE (automatic exposure) control.

The angular rate sensor 19 is a blurring detection section for detecting an angular rate when the digital camera is rotated with an X axis direction as a rotation center while the right hand side in the horizontal directions is set as the X axis direction as the digital camera is viewed from the object side.

On the other hand, the angular rate sensor 20 is a blurring detection section for detecting an angular rate when the digital camera is rotated with a Y axis direction as a rotation center while the upper side in the vertical directions is set as the Y axis direction.

The A/D converter 21 is adapted to convert an analog signal indicating the angular rate detected by the angular rate sensor 19 into a digital signal at a predetermined time interval (sampling interval). The A/D converter 21 is a part of the blurring detection section.

In a similar manner, the A/D converter 22 is adapted to convert an analog signal indicating the angular rate detected by the angular rate sensor 20 into a digital signal at the predetermined time interval (sampling interval). The A/D converter 21 is also a part of the blurring detection section.

The CPU 7 performs time integration on the digital signal converted by the A/D converter 21. This digital signal subjected to the time integration corresponds to the amount of rotation with the X axis of the camera main body as the rotation center. Then, whether the rotation direction about the X axis is clockwise or counter-clockwise is determined depending on a positive analog output signal or a negative analog output signal of the angular rate sensor 19.

In a similar manner, the CPU 7 performs time integration on the digital signal converted by the A/D converter 22. This digital signal subjected to the time integration corresponds to the amount of rotation with the Y axis of the camera main body as the rotation center. Then, whether the rotation direction about the Y axis is clockwise or counter-clockwise is determined depending on a positive analog output signal or a negative analog output signal of the angular rate sensor of the angular rate sensor 20.

The first release switch 18a is a first stage of a release switch made of automatic returning type two stages for inputting an instruction of the image pickup operation. When the release switch is pressed down and the first release switch 18*a* is turned on, a distance measurement and the photometry operation are performed.

The second release switch 18*b* is a second stage of a release switch made of automatic returning type two stages for inputting an instruction of the image pickup operation. When the release switch is pressed down further and the second release switch 18*b* is turned on, the image pickup element 1 performs the image pickup operation, thereby generating the image data in the above-mentioned manner. After being compressed, the image data is recorded in the recording medium 11.

The distance detection section 23 is adapted to detect a distance to the subject and can appropriately adopt a known structure.

The shooting mode setting section 25 is adapted to select one of a shutter priority shooting mode, an aperture priority shooting mode, and a program shooting mode.

The shooting condition setting section 26 is adapted to change various shooting conditions such as a shutter speed (exposure time), an aperture value, and an ISO sensitivity.

The CPU 7 incorporates the EEPROM 24 as a non-volatile memory for storing a relation among an exposure value Ev, Tv for performing the exposure control in an optimal way (apex value of the exposure time), and Av (apex value of the aperture value) as a program chart. The EEPROM 24 can appropriately store other information necessary to the digital camera.

A signal from the first release switch 18*a*, a signal from the second release switch 18*b*, a signal from the angular rate sensor 19 via the A/D converter 21, a signal from the angular rate sensor 20 via the A/D converter 22, a signal from the shooting mode setting section 25, and a signal from the shooting condition setting section 26 are inputted to the CPU 7. Then the CPU 7 is adapted to output instructions to the TG 5 and the SG 6.

Furthermore, the CPU 7 is connected to the information processing section 8, the DRAM 9, the lens driver system 14, the aperture driver system 16, and the distance detection section 23 in a bidirectional way and functions as a control section for controlling the entire digital camera including those parts. Also the CPU 7 doubles as the shooting section, the blurring detection section, a shooting number control section, a blurring compensation section, and the image synthesizing section.

To be specific, the CPU 7 is adapted to perform the above-mentioned auto-focus control as well as the AE control and switching of the drive mode of the image pickup element 1 based on signals for instructing taking in of still images from the first release switch 18*a* and the second release switch 18*b*. Furthermore, the CPU 7 is also adapted to perform a control for changing the opening of the aperture 17, an exposure time control on the image pickup element 1, and the like. Then, the CPU 7 sets a shooting mode of the digital camera on the basis of an input from the shooting mode setting section 25 and sets a shooting condition of the digital camera on the basis of an input from the shooting condition setting section 26. In addition, the CPU 7 is also adapted to perform a calculation for the amount of blurring and the like on the basis of outputs from the angular rate sensors 19 and 20.

Figure 2:
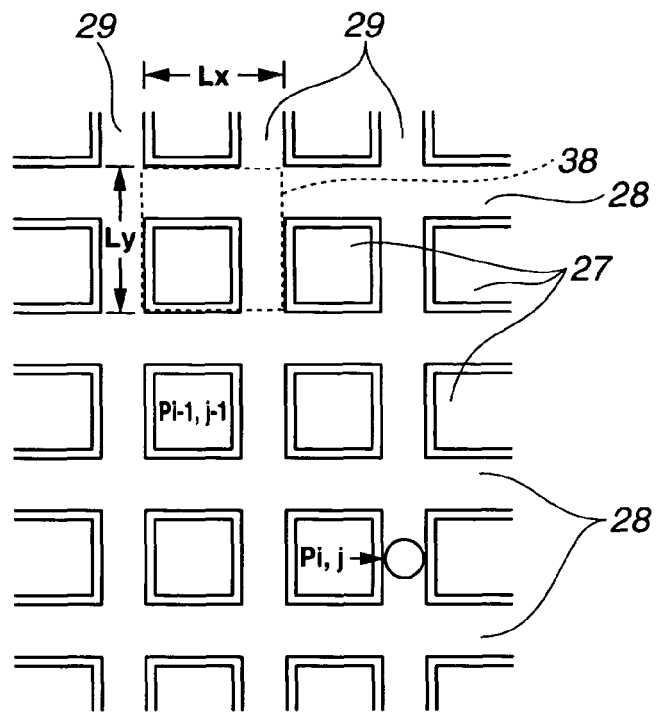
FIG. 2 shows a state where charge accumulated in a photodiode is transferred to a vertical transfer CCD as a first pixel charge according to the first embodiment.
Figure 3:
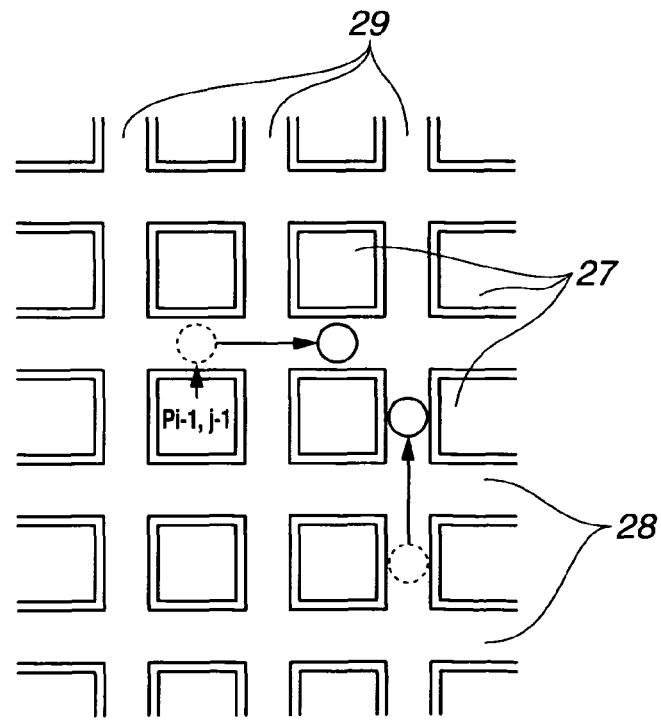
FIG. 3 shows a state where charge accumulated in a photo diode after reading of first pixel charge is transferred to a horizontal transfer CCD as second pixel charge and then transferred in a horizontal direction, and also the first pixel charge is transferred in a vertical direction according to the first embodiment.
Figure 4:
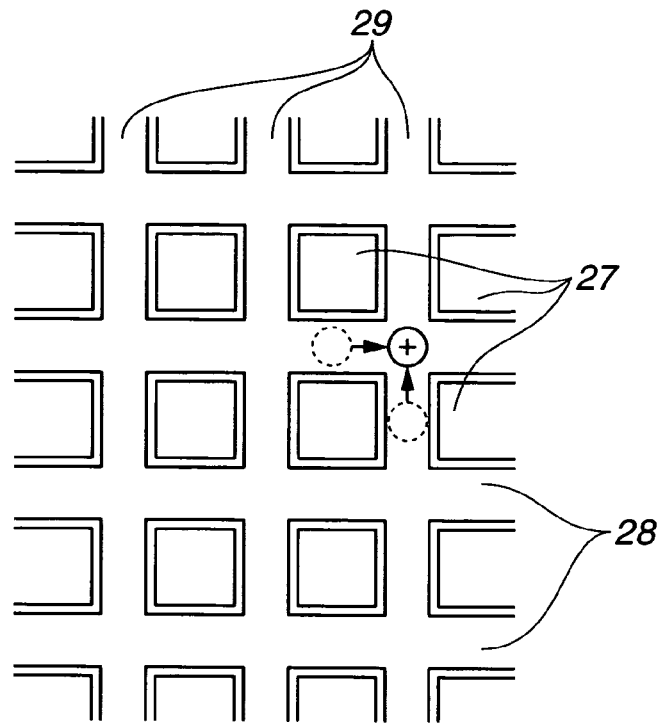
FIG. 4 shows a state in which the first pixel charge is added to the second pixel charge according to the first embodiment.
Figure 5:
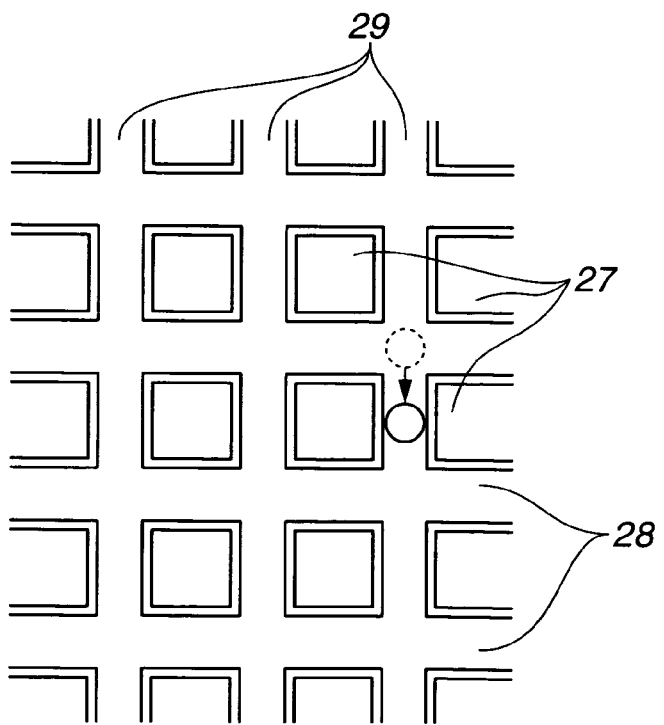
FIG. 5 shows a state where the added charge is saved to a charge holding section of the vertical transfer CCD within the same pixel according to the first embodiment.

Next, with reference to FIGS. 2 to 5, an operation principle of the image pickup element 1 will be described. FIG. 2 shows a state where charge accumulated in a photodiode is transferred to a vertical transfer CCD as a first pixel charge, FIG. 3 shows a state where charge accumulated in a photo diode after reading of first pixel charge is transferred to a horizontal transfer CCD as second pixel charge and then transferred in a horizontal direction, and also the first pixel charge is transferred in a vertical direction, FIG. 4 shows a state in which the first pixel charge is added to the second pixel charge, and FIG. 5 shows a state where the added charge is saved to a charge holding section of the vertical transfer CCD within the same pixel.

In the image pickup element 1, a plurality of photo diodes 27 for generating charge by receiving light beam from the subject are arranged in matrix. The photo diodes 27 arranged in matrix constitute a photoelectric conversion section.

Moreover, the image pickup element 1 includes horizontal transfers CCD 28 that are arranged adjacent in rows of the photo diodes 27 in the photoelectric conversion section and function as the horizontal transfer register, the blurring compensation section, and the synthesizing section. The horizontal transfer CCD 28 is adopted to store the first image obtained by reading the charge generated in the photo diodes 27 and transfers the first image in the horizontal direction.

In addition, the image pickup element 1 includes vertical transfers CCD 29 that are arranged adjacent in columns of the photo diodes 27 in the photoelectric conversion section and function as the vertical transfer register, the blurring compensation section, and the synthesizing section. The vertical transfer CCD 29 is adopted to store the second image according to the synthesized charge generated by synthesizing the charges obtained before the first image is obtained and transfers the second image in the vertical direction.

Then, an electrode part arranged at an intersection position of the horizontal transfer CCD 28 and the vertical transfer CCD 29, functions as the synthesizing section for synthesizing the first image and the second image in an analog manner.

It should be noted herein that the example is shown in which the plurality of photo diodes 27 are arranged in the lengthwise direction and in the crosswise direction perpendicular to the lengthwise direction to form a matrix, but the configuration is not limited to the above as long as an arrangement forms a substantial matrix. For example, the plurality of photo diodes 27 may be arranged in one direction and the other direction oblique to the one direction to form a matrix. At this time, the horizontal transfer CCD 28 and the vertical transfer CCD 29 may be arranged in directions to be obliquely intersected. Furthermore, the shape of the photo diode 27 is not limited to square or rectangle, and may have other various shapes of parallelogram, triangle, and hexagon.

One pixel 38 in the image pickup element 1 includes one of the photo diodes 27, and a part of the horizontal transfer CCD 28 and a part of the vertical transfer CCD 29 which are adjacent to the photo diode 27. Then, the size of the one pixel 38 is as follows. The length of the horizontal direction (crosswise direction) is set as Lx, and the length of the vertical direction (lengthwise direction) is set as Ly.

Operation of the image pickup element 1 with such a structure will be described.

Hereinafter, the photo diode arranged at the left top corner of the image pickup element 1 is denoted by "P1, 1" and the photo diode arranged at an i-th on the right hand side in the horizontal direction (i is an integer number equal to or larger than 1) and at an j-th on the lower side in the vertical direction (j is an integer number equal to or larger than 1) is denoted by "Pi, j".

FIG. 2 shows a state where the charge of the photo diode Pi, j which is subjected to the first photoelectric conversion (first pixel charge) (which is represented by a circle mark in the drawing) is shifted (read out) to the vertical transfer CCD 29 adjacent to the photo diode Pi, j. It should be noted that in FIG. 2, only the first pixel charge related to the photo diode Pi, j is shown but other charges accumulated through the photoelectric conversion in all the other photo diodes for the same period of time are also shifted in a similar manner to the vertical transfers CCD 29 all at once.

FIG. 3 shows a state where the charge of the photo diode Pi−1, j−1 accumulated through the photoelectric conversion immediately after the first pixel charge is shifted (second pixel charge) is firstly shifted (read out) to the horizontal transfer CCD 28 adjacent to the photo diode Pi−1, j−1. It should be noted that in FIG. 3 as well, only the second pixel charge related to the photo diode Pi−1, j−1 is shown but other charges accumulated through the photoelectric conversion in all the other photo diodes for the same period of time are also shifted in a similar manner to the horizontal transfer CCD 28 all at once. Herein, the light from the subject reaching the photo diode Pi,j at the time of the first pixel charge accumulation is shifted to a position reaching the photo diode Pi−1, j−1 at the time the second pixel charge accumulation because of blurring of images due to hand movement or the like. The change in the reaching position of this light can be found out only when the accumulation of the second pixel charge has been completed. Thus, in the state shown in FIG. 2, the first pixel charge is not yet transferred and is only held (stored) in the vertical transfer CCD 29. However, after reading out the second pixel charge, the change in the reaching position of the light is found out on the basis of the outputs from the angular rate sensors 19 and 20, the positional relation between the first pixel charge and the second pixel charge related to the same subject light is obtained and in order to conduct a synthesis to be described later, the charges are transferred to the positions adjacent to each other (position in the same one pixel 38). That is, FIG. 3 shows an example in which the second pixel charge is transferred by one pixel on the horizontal transfer CCD 28 in the right hand side on the paper surface, and also the first pixel charge is transferred by one pixel on the vertical transfer CCD 29 in the upper side on the paper surface. It should be noted that the transfer of the first pixel charge and the transfer of the second pixel charge are performed for the pixel charges of all the photo diodes as described in the above. In order to perform the above-mentioned transfer of the horizontal transfer CCD 28 and transfer of the vertical transfer CCD 29, it is necessary to appropriately arrange transfer electrodes to avoid interference between the charge in the horizontal transfer CCD 28 and the charge in the vertical transfer CCD 29 at the positions intersected by the respective transfer CCDs.

FIG. 4 shows a state where the first pixel charge and the second pixel charge are shifted to the intersection position between the horizontal transfer CCD 28 and the vertical transfer CCD 29, and the synthesis is conducted at the intersection position (the synthesis is represented by "+" in FIG. 4). It is needless to mention that this synthesis is performed for the first pixel charges to all the photo diodes and the second synthesized charges related to all the photo diodes.

As a result, the first image (image composed of all the first pixel charges) and the second image (image composed of all the second pixel charges) continuously shot immediately after the first image is shot are shifted by the amount of blurring, in other words, after the blurring is compensated, the synthesis is conducted.

It should be noted that when the third or after time-division image is newly read out, the first image corresponds to a synthesized image obtained by synthesizing the previous time-division images (which is obtained by subsequently compensating the blurring and synthesizing the time-division images from the first time-division image to the time-division image one before the latest image). Thus, by performing the operations shown in FIG. 4, the synthesis is conducted after the relative amount of blurring between the new time-division image (image composed of all the new pixel charges) and the synthesized image is compensated.

FIG. 5 shows a state where for example, the pixel charge synthesized at the intersection position between the horizontal transfer CCD 28 and the vertical transfer CCD 29 is transferred (saved) to the charge holding section of the vertical transfer CCD 29 in the same pixel. The intersection position is used for both the horizontal transfer and the vertical transfer, and therefore if the synthesized charge is held at the intersection position, the synthesis with the pixel charge read out next cannot be conducted.

In view of the above, herein, the charge after the synthesis is once saved to the charge holding section of the vertical transfer CCD 29. As a result, when the next pixel charge is read out to the horizontal transfer CCD 28, as in the same manner described above, the pixel synthesis can be performed.

It should be noted herein that, the charge after the synthesis is transferred (saved) to the charge holding section of the vertical transfer CCD 29 in the same pixel, but instead of this, the charge after the synthesis may be transferred (saved) to the charge holding section of the horizontal transfer CCD 28 in the same pixel. At this time, the next pixel charge is read out to the vertical transfer CCD 29. Also, the pixel charge after the synthesis is not necessarily saved within the same pixel.

Therefore, other than the examples shown in FIGS. 2 to 5, the synthesized charge may be stored in one of the memory sections of the horizontal transfer CCD 28 and the vertical transfer CCD 29, and the new pixel charge may be read out and stored in the other memory section of the horizontal transfer CCD 28 or the vertical transfer CCD 29.

As described in the above, the following sequence is repeatedly performed.

Image shift to the horizontal transfer CCD
Charge transfer for relative blurring compensation
Synthesis of the charges
Saving of the synthesized charge from the intersection position between the horizontal transfer CCD and the vertical transfer CCD. It should be noted that the time-division image of the first time-division shooting among the plurality of time-division shootings has the amount of blurring of 0 and the synthesized value of the vertical transfer CCD of 0, so it suffices that the similar sequence is executed.

It should be noted that FIGS. 2 to 5 show the example in which the new time-division image is shifted by one pixel in the left-hand side and one pixel in the upper direction with respect to the synthesized image, but in general the new time-division image is shifted in the horizontal direction and the vertical direction by the appropriate number of pixels according to the about of blurring.

The operation principle of the blurring compensation as described in the above is for compensating the relative blurring in the X and Y directions between the two image accumulated in the horizontal transfer CCD and the vertical transfer CCD which are arranged while surrounding the respective photo diodes of the image pick up section (refer to FIG. 6). On the other hand, as will be described with reference to FIG. 7, an accumulation section for accumulating an image is provided separately from the image pickup section in the image pickup element 1. Then, the vertical transfer CCD for holding the image obtained through this time-division shooting and the horizontal transfer CCD for holding the synthesized image obtained through the synthesis after the blurring compensation between this time-division image and the previous time-division are provided in the accumulation section. In this case as well, in a similar manner, the image in which blurring is compensated in the image pickup element 1 can be generated.

Next. FIG. 6 shows a first configuration example of the image pickup element 1.

The image pickup element 1 according to the first configuration example is structured to include, as shown in FIG. 6, the photo diodes 27 for subjecting the image to the photoelectric conversion for accumulation, the horizontal transfer CCD 28 for transferring the charges read out from the photo diodes 27 in the horizontal direction, the vertical transfer CCD 29 for transferring the charges read out from the photo diodes 27 in the vertical direction, a charge release drain 30 for releasing the charge transferred to an end part of the horizontal transfer CCD 28 or the vertical transfer CCD 29 to the outside of a transfer path, and a reading horizontal transfer CCD 31 for reading out the charge transferred from the vertical transfer CCD 29 from the image pickup element 1 to the outside.

Herein, the charge release drains 30 are arranged to form a U shape along the periphery of the image pickup section except the reading horizontal transfer CCD 31 side so that the charges transferred to both end parts of all the horizontal transfers CCD 28 and an end parts on the upper side of the paper surface in all the vertical transfers CCD 29 of FIG. 6 can be released to the outside of the transfer path.

In such a configuration, the pixel charge accumulated through the photoelectric conversion by the photo diodes 27 is read out to the horizontal transfer CCD 28 and then accumulated therein. The charge accumulated in the horizontal transfer CCD 28 forms the first image as a whole. Then, the vertical transfer CCD 29 stores the previous synthesized charge. The synthesized charge forms the second image as a whole. The newly read pixel charge is transferred by the shift amount calculated on the basis of the output of the angular rate sensor 20 on the basis of the blurring about the Y axis for compensating the relative amount of blurring in the horizontal direction with respect to the second image stored in the vertical transfer CCD 29 in the read horizontal transfer CCD 28. On the other hand, the second image that is the synthesized image stored in the vertical transfer CCD 29 is transferred by the shift amount calculated on the basis of the blurring about the X axis calculated on the basis of the output of the angular rate sensor 19 for compensating the relative amount of blurring in the vertical direction with respect to the first image stored in the horizontal transfer CCD 28 in the vertical transfer CCD 29.

In this way the shift by the amount for compensating the blurring is performed, and thereafter, at the intersection position between the horizontal transfer CCD 28 and the vertical transfer CCD 29, the newly read out pixel charge and the previous synthesized charge are synthesized to be stored in the vertical transfer CCD 29, thereby generating a new synthesized charge in which the relative blurring is compensated. The operations described above are performed by the predetermined number of times set as the number of times for performing the time-division shooting, for example, 10 times. Herein, the charges accumulated in the vertical transfer CCD 29 and the horizontal transfer CCD 28 are shifted in the upper, lower, left, and right according to the blurring and therefore the charge reaching the end part of the respective transfer CCDs 28 and 29 is released via the charge release drain 30 to the outside of the transfer path.

Figure 8:
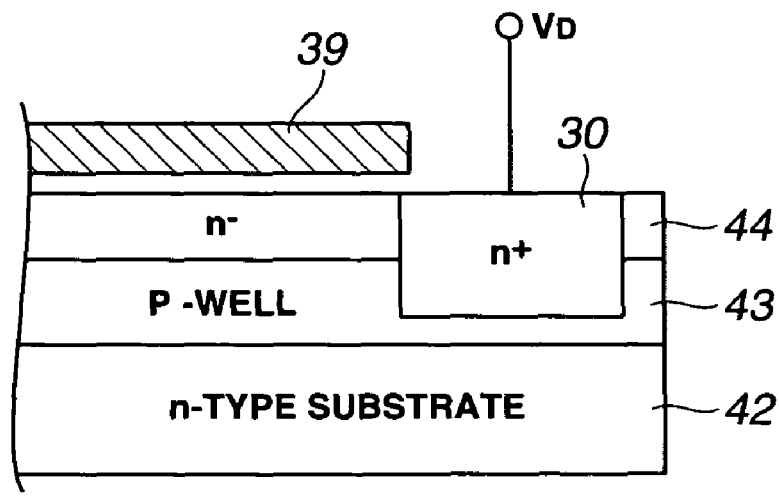
FIG. 8 shows a configuration example of a charge discharge drain according to the first embodiment.

In the first configuration example shown in FIG. 6, the charge release drain 30 is configured as shown in FIG. 8. Herein, FIG. 8 shows a configuration example of the charge release drain 30. In the configuration example shown in FIG. 8, on a surface of an n-type substrate (for example, n-type silicon substrate) 42, first of all, a p-type diffused area (p-well) 43 and an n-type diffused area 44 are formed in the stated order toward the front surface side. Furthermore, an n+ diffusion area drain 30 is formed so as to be adjacent to a potential well (n− diffusion area 44) located under a transfer electrode 39 that is the end part of the horizontal transfer CCD 28 or the vertical transfer CCD 29. Then, the charge reaching the transfer electrode 39 that is the end part is released via the n+ diffusion area drain 30. On the other hand, the charge reaching the end part of the reading horizontal transfer CCD 31 side of the vertical transfer CCD 29 is released via the reading horizontal transfer CCD 31. With the provision of such a charge release mechanism, it is possible to avoid the overflow of the charge at the horizontal transfer CCD 28 and the vertical transfer CCD 29.

The thus finally obtained synthesized charge functions as a charge constitute an image in which blurring is compensated.

It should be noted that in the first configuration shown in FIG. 6, the time-division images are read out to the horizontal transfer CCD 28 and then the synthesized image is held at the vertical transfer CCD 29, but instead of this construction, it is also possible that the time-division images are read out to the vertical transfer CCD 29 and the synthesized image is held at the horizontal transfer CCD 28.

Next, FIG. 7 shows the second configuration example of the image pickup element 1.

The image pickup element shown in FIG. 7 is a so-called FIT type CCD (frame interline transfer CCD) in which the image pickup section 1*a* and an accumulation section 1*b* are separated from each other.

The image pickup section 1*a* is structured to include a photo diode 32 for accumulating an image through photoelectric conversion and a vertical transfer CCD 33 for transfer a charge read out from the photo diode 32 in the vertical direction.

The accumulation section 1*b* is structured to include a vertical transfer CCD 34 for transferring the charge transferred from the vertical transfer CCD 33 of the image pickup section 1*a* to a predetermined position in the accumulation section 1*b*, a horizontal transfer CCD 35 arranged so as to intersect the vertical transfer CCD 34, a charge release drain 36 for releasing the charge transferred to both ends of the horizontal transfer CCD 35 to the outside of the transfer path, a charge release drain 41 for releasing the charge transferred to the end part of the image pickup section 1*a* side of the vertical transfer CCD 34 to outside of the transfer path, and a reading horizontal transfer CCD 37 for reading out the charge transferred from the vertical transfer CCD 34, to the outside from the image pickup element 1.

In the thus configured image pickup element 1, the pixel charge accumulated through the photoelectric conversion by the photo diode 32 is transferred via the vertical transfer CCD 33 to the vertical transfer CCD 34 of the accumulation section 1*b*. The charge transferred to the vertical transfer CCD 34 forms the first image as a whole First of all, the first image transferred to the vertical transfer CCD 34 through the first time-division shooting is then transferred to the horizontal transfer CCD 35. This image accumulated at the horizontal transfer CCD 35 is set as a second image.

The image obtained through the next time-division shooting is again transferred to the vertical transfer CCD 34. Then the first image is shifted by a predetermined amount in a direction for cancelling the relative deviation in the vertical direction with respect to the second image accumulated at the horizontal transfer CCD 35 on the basis of the blurring about the X axis that is calculated on the basis of the output from the angular rate sensor 19. Then, the second image is shifted by a predetermined amount in a direction for cancelling the relative deviation in the horizontal direction with respect to the first image accumulated at the vertical transfer CCD 34 on the basis of the blurring about the Y axis that is calculated on the basis of the output from the angular rate sensor 20. Then, the first image and the second image that are shifted so as to cancel the relative blurring in the vertical direction and the horizontal direction are synthesized at the intersection position between the vertical transfer CCD 34 and the horizontal transfer CCD 35 or in the vicinity thereof before being accumulated at the horizontal transfer CCD 35.

After that, the time-division shooting is conducted again, an image obtained by this shooting is held at the vertical transfer CCD 34 of the accumulation section 1b as the first image. Then, the synthesized image in which the blurring is compensated in a similar manner is generated to be held at the horizontal transfer CCD 35. Such operations are performed by a predetermined number of times set as the number of times for performing the time-division shooting, for example, 10 times. Herein, the charges accumulated at the vertical transfer CCD 34 and the horizontal transfer CCD 35 are shifted according the blurring in the upper, lower, left, and right directions, and therefore the charge reaching the end part of the horizontal transfer CCD 35 is released via the charge release drain 36, the charge reaching the end part of the image pickup section 1a side of the vertical transfer CCD 34 is released via the charge release drain 41, and the charge reaching the end part of the reading horizontal transfer CCD 37 side of the vertical transfer CCD 34 is released via the reading horizontal transfer CCD 37, to the outside of the transfer path.

The charge release drain 36 in the image pickup element 1 according to the second configuration example shown in FIG. 7 functions as an n+diffusion area drain provided so as to be adjacent to the potential well (n– diffusion area) located under the transfer electrode that is the end part of the horizontal transfer CCD 35, similarly to the charge release drain 30 (refer to FIG. 8) in the image pickup element 1 according to the first configuration example shown in FIG. 6.

Figure 9:
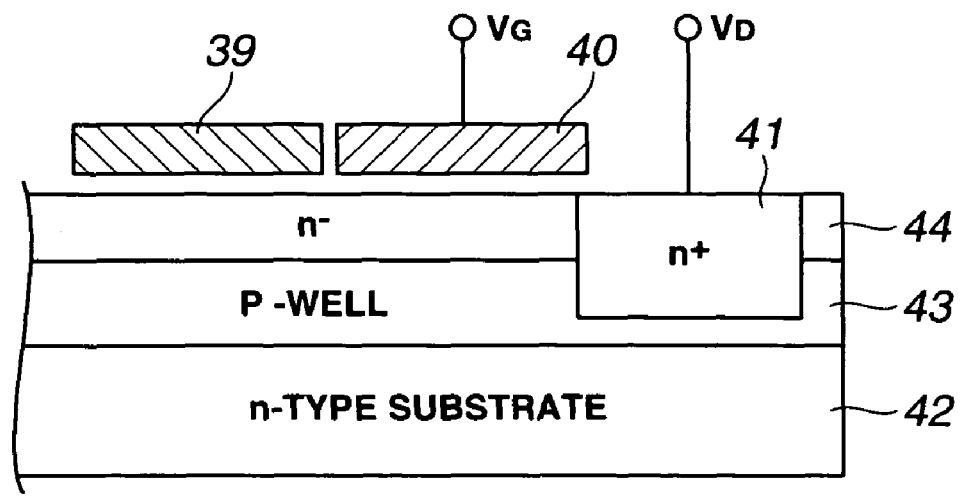
FIG. 9 shows another configuration example of a charge discharge drain according to the first embodiment.

On the other hand, if the charge release drain 41 in the image pickup element 1 according to the second configuration example is configured similarly to that of FIG. 8, the charge from the image pickup section 1a is not transferred to the accumulation section 1b. In view of the above, the charge release drain 41 is configured as shown in FIG. 9. Herein, FIG. 9 shows a configuration example of the charge release drain 41. That is, a gate electrode 40 is provided so as to be adjacent to the transfer electrode 39 that is the end part of the image pickup section 1a side of the vertical transfer CCD 34 and the charge release drain 41 that is made of the n+ diffusion area is arranged at the position opposed to the transfer electrode 39 with the gate electrode 40 interposed therebetween. Then, the charge transferred to the end part of the image pickup section 1a side of the vertical transfer CCD 34 is selectively released via the gate electrode 40 to the charge release drain 41.

That is, when the charge from the image pickup section 1a is transferred to the accumulation section 1b, the gate electrode 40 is applied with a low voltage. As a result, the charge transferred through the vertical transfer CCD 34 is prevented from being released to the charge release drain 41. On the other hand, when the charge accumulated at the accumulation section 1b is transferred in the vertical transfer CCD 34 for compensating the blurring, the gate electrode 40 is applied with a high voltage, whereby the charge transferred to the end part of the image pickup section 1a side of the vertical transfer CCD 34 is released to the charge release drain 41. Then, the charge reaching the end part on the reading horizontal transfer CCD 37 side of the vertical transfer CCD 34 is released via the reading horizontal transfer CCD 37.

With such a configuration and actions, the charge can be prevented from overflowing at the vertical transfer CCD 34 and the horizontal transfer CCD 35.

It should be noted that in the above-mentioned configuration example, at the time of charge transfer for the blurring compensation, the charge of the end part of the image pickup section 1a side of the vertical transfer CCD 34 is released to the charge release drain 41. However, instead of this configuration, at the time of charge transfer for the blurring compensation, the vertical transfer CCD 33 may be driven at the same time to transfer (release) the charge reaching an upper end part of the vertical transfer CCD 34 to the vertical transfer CCD 33, thereby preventing the charge overflow. Then, in this case, the charge released to the vertical transfer CCD 33 is released via the vertical transfer CCD 34 (the vertical transfer CCD 34 without holding the charge in a state where the synthesis of the first image and the second image is performed to be accumulated at the horizontal transfer CCD 35) and the reading horizontal transfer CCD 37, and thereafter the next time-division shooting may be preformed.

When the blurring compensation and synthesis operations are completed by the predetermined of times as described above, the image held at the horizontal transfer CCD 35 is transferred to the vertical transfer CCD 34 and then read out to the outside via the vertical transfer CCD 34 and the reading horizontal transfer CCD 37 from the image pickup element 1.

Figure 10:
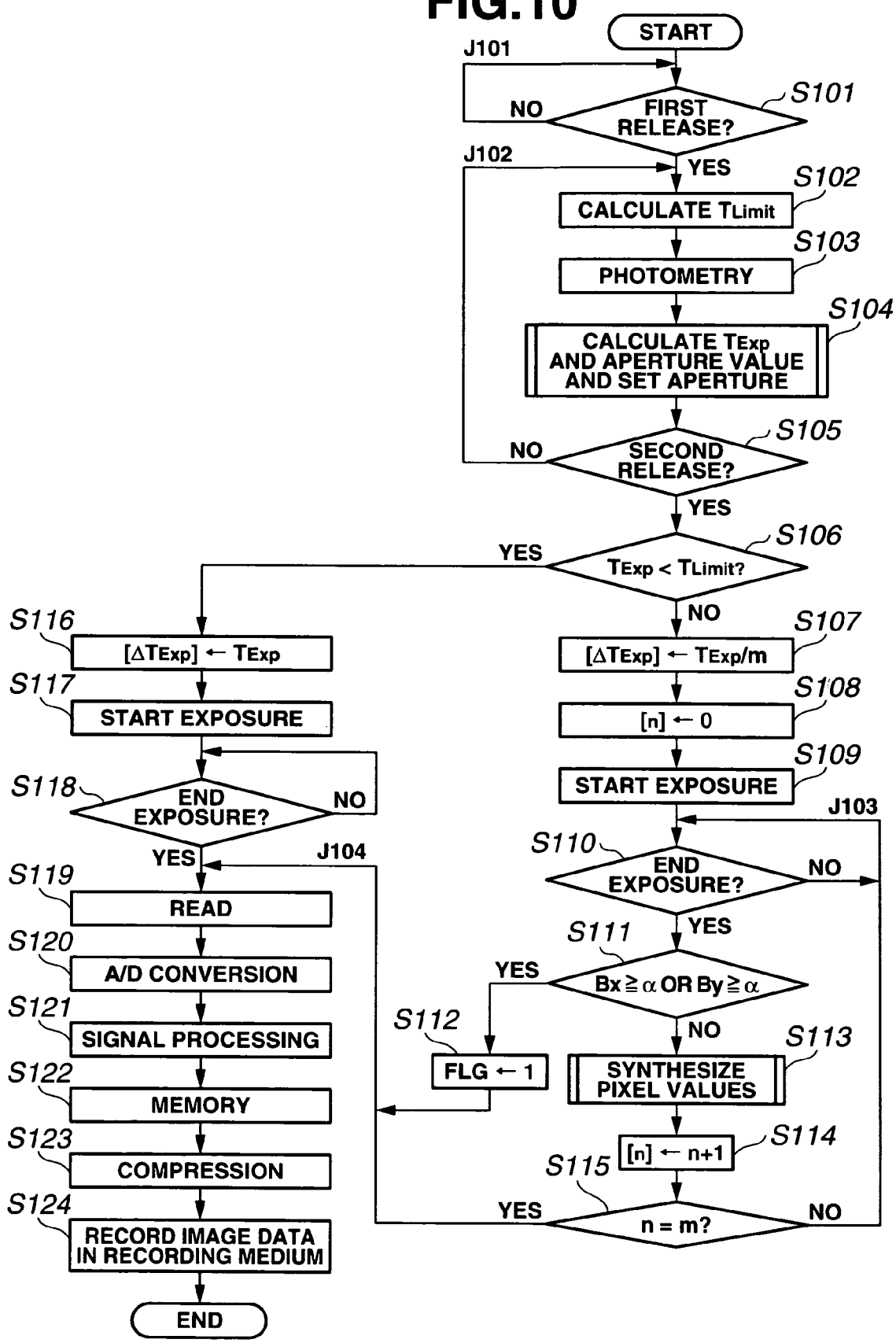
FIG. 10 is a flowchart showing a process example corresponding to the image pickup element of the second configuration example shown in FIG. 7 when an image is picked up and recorded by a digital camera according to the first embodiment.

Next, FIG. 10 is a flowchart showing a process example corresponding to the image pickup element 1 of the second configuration example shown in FIG. 7 when an image is picked up by a digital camera.

When a power source of the digital camera is turned on (for example, a battery is exchanged) or an operation start switch not shown in the drawing (for example, a power source switch) is operated, an operation of this digital camera is started.

Once a process is started, after a predetermined initiative value setting or the like is conducted, first of all, it is determined whether or not the first release switch 18a is in a closed state in response to a release operation of a photographer (Step S101).

Herein, in the case where the first release switch 18a is not in the closed state, the process is branched to J101, the detection of the first release switch 18a is similarly repeatedly performed. It should be noted that in actuality, a display is conducted or such an operation for detection of an input of a key not shown is performed between J101 and Step S101, but a description of the above-mentioned general operation will be appropriately omitted below as well.

In Step S101, when it is detected that the first release switch 18a is in the closed state, next, the blurring limit exposure time $T_{Limit}$ is calculated (Step S102). The blurring limit exposure time $T_{Limit}$ is an assumed period of time during which the amount of blurring from the start of exposure reaches an allowable limit amount of blurring.

Now the blurring limit exposure time $T_{Limit}$ will be described. As a longtime empirical rule related to so-called Leica frame (also known as: double frame) camera of 24 mm height×36 mm width (43.28 mm diagonal) in a 35 millimeter film camera, it is known that when a focal length of a shooting lens in unit of the millimeter is set as f, the blurring limit exposure time $T_{Limit}$ becomes $T_{Limit} \approx 1/f$ (second). In this embodiment, this empirical rule is applied in consideration with a size of a shooting image frame set in an effective image pickup area of the image pickup element 1 of the digital camera. It should be noted that the blurring limit exposure time $T_{Limit}$ does not necessarily use a value given on the basis of 1/f, and to be brief, such an exposure time may be used with which the blurring is not substantially generated. Therefore, the blurring limit exposure time $T_{Limit}$ may be set as a time shorter than the exposure time given on the basis of 1/f in general.

Next, photometry is performed on the brilliance of the subject (Step S103). This photometry is adapted to monitor the levels of image signals repeatedly outputted from the image pickup element 1 so that the brilliance of the subject is calculated. That is, the image signals read from the image pickup element 1 is processed by the CDS 2 and amplified by the gain controller amplifier 3. Then the signals are converted to digital values by the A/D converter 4, passed through the information processing section 8, and temporarily stored in the DRAM 9. Among the image signals stored in the DRAM 9, the image signal in a predetermined area in the vicinity of the center section in the entire image, for example, is read out by the CPU 7 to find out addition average value at the level. Then, the CPU 7 calculates a brilliance of the subject (Bv) on the basis of the thus found out addition average value.

Subsequently, the CPU 7 calculates a shutter speed value (exposure time) $T_{Exp}$ and the aperture value of the aperture 17 which are necessary to obtain the appropriate exposure and also performs the aperture setting of the aperture 17 on the basis of the calculation results via the aperture driver system 16 (Step S104). Herein, the exposure time $T_{Exp}$ has a relation of $T_{Exp} = m \times \Delta T_{Exp}$ when the exposure time of the time-division shooting is set as $\Delta T_{Exp}$ and the number of times for performing the time-division shooting is set as m.

Next, it is determined whether or not the second release switch 18b is in the closed state (Step S105). Herein, when the second release switch 18b is not in the closed state, as long as the first release switch 18a is in the closed state, the process is branched to J102, and while the above-mentioned processes in Steps S102 to S105 are repeatedly performed, a moment is waited for when the second release switch 18b is put into the closed state.

In this way, in Step S105, when it is determined that the second release switch 18b is in the closed state, it is determined whether or not the exposure time $T_{Exp}$ is shorter than the blurring limit exposure time $T_{Limit}$ (Step S106).

In this Step S106, when it is not determined that $T_{Exp} < T_{Limit}$, next, a value obtained by dividing the exposure time $T_{Exp}$ by the number of times m for performing the time-division shooting is stored in a memory for storing the exposure time $\Delta T_{Exp}$ of the time-division shooting (Step S107). It should be noted that [ ] means a memory that stores data in brackets. Therefore, [$\Delta T_{Exp}$] means a memory that stores a variable $\Delta T_{Exp}$ in brackets.

Next, an initial value "0" is stored in a memory [n] that stores the number of times n for actually performing the time-division shooting (Step S108). Herein, as the exposure time of the time-division shooting $\Delta T_{Exp}$, there are a method of using the blurring limit exposure time $T_{Limit}$ and a method of using the exposure time obtained by dividing the exposure time $T_{Exp}$ calculated in Step S103 by the previously set number of times m for performing the time-division shooting. The method of using the blurring limit exposure time $T_{Limit}$ as the exposure time of the time-division shooting $\Delta T_{Exp}$ is superior in compensating the blurring with certainty but if the exposure time $T_{Exp}$ becomes long, the number of times for performing the time-division shooting is increased. If the number of times for performing the time-division shooting is increased, the signal amount obtained through one time of the time-division shooting becomes small, and therefore S/N (signal to noise ratio) may become low. Then, the saturation signal amount of the photo diode needs to be adjusted in accordance with the number of times for performing the time-division shooting, and thus the configuration of the image pickup element becomes complicated. Therefore, it is better when the type of the number of times m for performing the time-division shooting is as few as possible. In view of the above, in this embodiment, the number of times m for performing the time-division shooting has only one type. Then, the exposure time of the time-division shooting uses a value obtained by dividing the exposure time $T_{Exp}$ by m.

Subsequently, the exposure is started (Step S109). Immediately before the start of exposure, the image pickup element 1 is repeatedly applied with a substrate application high voltage pulse VSUB of the image pickup element 1 for forcedly releasing the charge accumulated at the photo diode 32 to a semiconductor substrate (substrate=vertical overflow drain VOFD). After this application of the high voltage pulse VSUB is completed and a moment when the value of VSUB is set to a value in accordance with the number of times m for performing the time-division shooting is the start of exposure in Step S109.

Next, it is determined whether or not the first time-division shooting is completed (Step S110). Herein, until it is determined that the first time-division shooting is completed, the process is branched to J103 and stands by this time-division shooting.

In this way, in Step S110, when it is determined that the first time-division shooting is completed, a high voltage transfer pulse is applied to a transfer gate arranged between the photo diode 32 of the image pickup element 1 and the vertical transfer CCD 33, thereby shifting the charge accumulated at the photo diode 32 to the vertical transfer CCD 33 of the image pickup section 1a. This charge shifted to the vertical transfer CCD 33 is then transferred to the vertical transfer CCD 34 of the accumulation section 1b.

Figure 12:
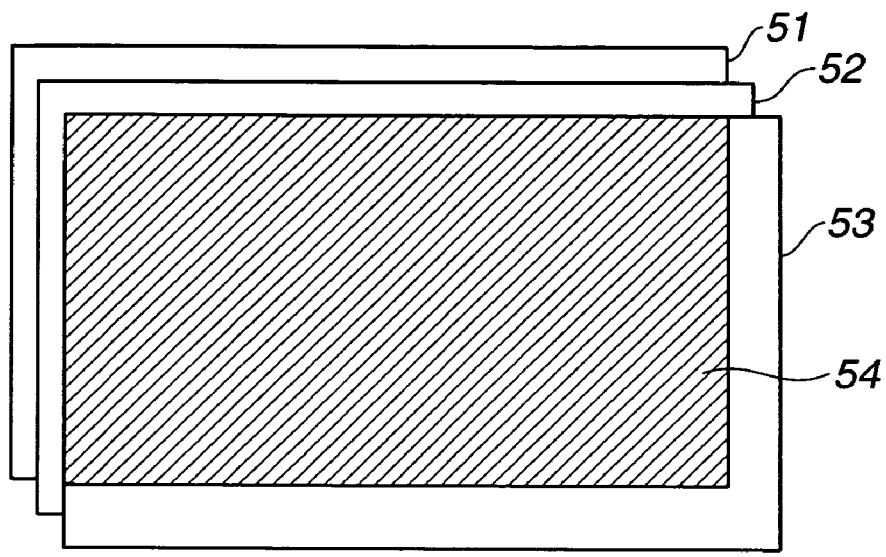
FIG. 12 shows an effective area in a superposition relation of three time-division images according to the first embodiment.
Figure 13:
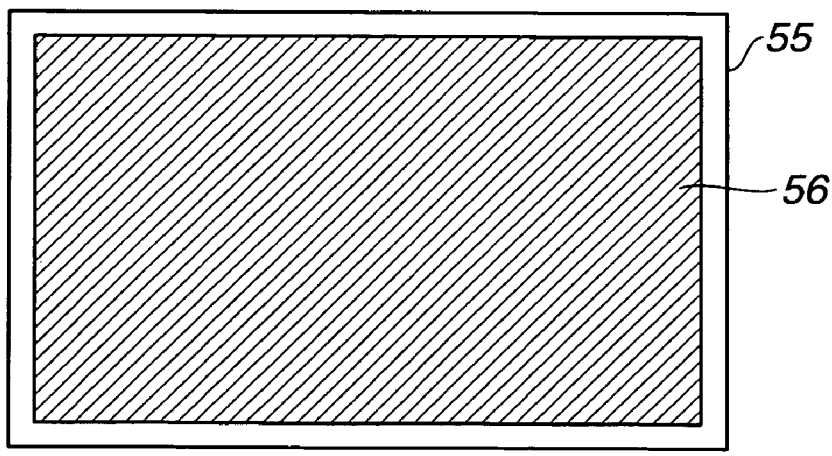
FIG. 13 shows an effective area in an image pickup area of the image pickup element according to the first embodiment.

Now, with reference to FIGS. 12 and 13, effective areas of the image pickup element will be described. FIG. 12 shows an effective area in a superposition relation of three time-division images and FIG. 13 shows an effective area in the image pickup area of the image pickup element.

First of all, FIG. 12 shows a case where a time-division image 51 and a time-division image 52, and a time-division image 53 are shot in a time-division manner in the stated order and a positional relation among the images is deviated as shown in the drawing while the images are arranged so that the same subject in each of the images positioned at the same position. In such a case, an effective area 54 that is synthesized after the blurring compensation in the end is formed of an area where three of the time-division images 51, 52, and 53 are all overlapped one another. Then, the effective area 54 becomes narrower as the amount of blurring of the images becomes larger.

In usual cases, it suffices that a predetermined area previously set on the basis of the long side and the short side of the image (for example, an area of 98% of length and width of the image) is defined as an effective area 56 in an image pickup area 55 (refer to FIG. 13) and other areas are not set as the effective area. However, depending on a skill or the like of a photographer, expectedly large blurring may occur. In view of the above, after the first time-division shooting is completed, it is determined whether or not an absolute value Bx of the amount of blurring in the X direction from the start position of exposure or an absolute value By of the amount of blurring in the Y direction from the start position of exposure is equal to or larger than a previously set predetermined value α (the predetermined value α is obtained through modification into a value with which an image at least including the effective area 56 as the synthesized image can be secured when both the absolute values Bx and By are smaller than α (Step S111).

Then, in Step S111, when it is determined that at least one of the absolute value Bx of the amount of blurring in the X direction and the absolute value By of the amount of blurring in the Y direction is equal to or larger than the predetermined value α, the loop of the time-division exposure is escaped, and after a flag FLG is set as 1 (Step S112), the process is shifted to a reading out process on an image in Step S119 which will be described later (J104). This process is performed because when the amount of blurring is equal to or larger than the predetermined value α, the effective area of the image in which the blurring is properly compensated becomes narrower than the previously set predetermined area, and to prevent this situation, this time-division shooting is ended and the effective area with the predetermined size is to be secured.

After that, in Step S112, when FLG is set as 1, it is meant that the number of times for performing the time-division shooting does not reach the predetermined times m. The overall exposure time does not reach $T_{Exp}$ and the level of the synthesized image is lower than the appropriate level. Therefore, at this time, as will be described above, the image is amplified by the gain controller amplifier 3. For example, if the number of times for performing the time-division shooting is set to k (k is a positive integer smaller than m), the amplification gain of the gain controller amplifier 3 is m/k times of the normal case.

On the other hand, in Step S111, when it is determined that both the absolute value Bx of the amount of blurring in the X direction and the absolute value By of the amount of blurring in the Y direction are smaller the predetermined value α, next, the pixel value synthesis process is performed (Step S113). In the pixel value synthesis, as has been already described above, after the first image in the vertical transfer CCD 34 and the second image held in the horizontal transfer CCD 35 obtained through the time-division shooting are shifted in the respective transfers CCD 34 and 35 to compensate the blurring on the basis of the amounts of blurring in the X and Y directions which are calculated on the basis of the output signals from the angular rate sensors 19 and 20, the synthesis process is conducted. The pixel value synthesis process is conducted at a higher speed than the exposure time $\Delta T_{Exp}$ in the time-division shooting in usual cases.

Next, n+1 is stored in the memory [n] that stores the number of times n for performing the time-division shooting already performed (Step S114).

After that, it is determined whether or not the number of times n for performing the time-division shooting already performed is equal to the set number of times m for performing the time-division shooting (Step S115).

Herein, when the relation of n=m is not achieved, the process is branched to J103, and the time-division shooting process and the pixel value synthesis process are repeatedly performed as described above.

In Step S115, when it is determined that the relation of n=m is established, the process is branched to J104, and the synthesized image stored in the horizontal transfer CCD 35 is transferred to the vertical transfer CCD 34 and thereafter the reading out process to be described later in Step S119 is conducted.

On the other hand, when it is determined in Step S106 that the relation of $T_{Exp} < T_{Limit}$ is established, no substantial blurring occurs without performing the time-division shooting. Therefore, at this time, the exposure time $T_{Exp}$ is stored in the memory $[\Delta T_{Exp}]$ (Step S116).

Next, the exposure is started (Step S117), and it is determined whether or not the exposure time reaches the exposure time $\Delta T_{Exp}$ stored in the memory $[\Delta T_{Exp}]$. Then, when it is determined the exposure time reaches the exposure time $\Delta T_{Exp}$, the charge generated by the photo diode 32 is shifted to the vertical transfer CCD 33, thereby ending the exposure (Step S118). After this exposure is ended, the charge of the vertical transfer CCD 33 in the image pickup section 1a is transferred to the vertical transfer CCD 34 of the accumulation section 1b. On the other hand, until the exposure time reaches the exposure time $\Delta T_{Exp}$, the above-mentioned determination is repeatedly performed.

In this manner, when the exposure time $T_{Exp}$ is shorter than the blurring limit exposure time $T_{Limit}$, this time-division shooting is not performed. As the image without blurring is outputted by one shooting similarly to the conventional shooting, the process becomes facilitated and it is possible to prevent wasteful electric power consumption due to the blurring compensation.

When it is determined in Step S118 that the exposure is ended, when it is determined in Step S112 that the flag FLG is completed to be set as 1, or when it is determined in Step S115 that the relation of n=m is established, the shot image is read out to the outside via the vertical transfer CCD 34 and the reading horizontal transfer CCD 37 from the image pickup element 1 (Step S119).

The image signal thus read out from the image pickup element 1 is processed by the CDS 2 and amplified by the gain controller amplifier (AMP) 3. After that, the image signal is converted into a digital signal by the A/D converter 4 (Step S120). It should be noted that when the flag FLG is set as 1 in Step S112, the amplification gain of the gain controller amplifier (AMP) 3 is m/k times of the normal amplification gain as described above.

After that, the image data obtained through the digitalization of the image signal is stored in the buffer memory 8a and then subjected to a predetermined signal process by the information processing section 8 (Step S121).

The signal process by the information processing section 8 includes a process for extracting an image with a previously set area in which it is assumed that the blurring compensation has been effectively conducted from the image data that is outputted from the image pickup element 1. That is, the information processing section 8 has also a function of the effective area extraction section. As has been described above, in the image pickup element 1, in order that an effective area in which an area where all the time-division images are overlapped one another is previously set (the effective area 56 shown in FIG. 13) is included, the synthesis process is only performed on the time-division image in which the amount of blurring with the first shot time-division image as the reference is smaller than the previously set predetermined value α. Therefore, the information processing section 8 can easily perform the effective area extraction process.

Next, the image data subjected to the signal process by the information processing section 8 is temporarily stored in the DRAM 9 (Step S122).

After that, the image data stored in the DRAM 9 is compressed by the compress/expand section 10 (Step S123) and the compressed image data is recorded in the recording medium 11 (Step S124), thereby ending this process.

Figure 11:
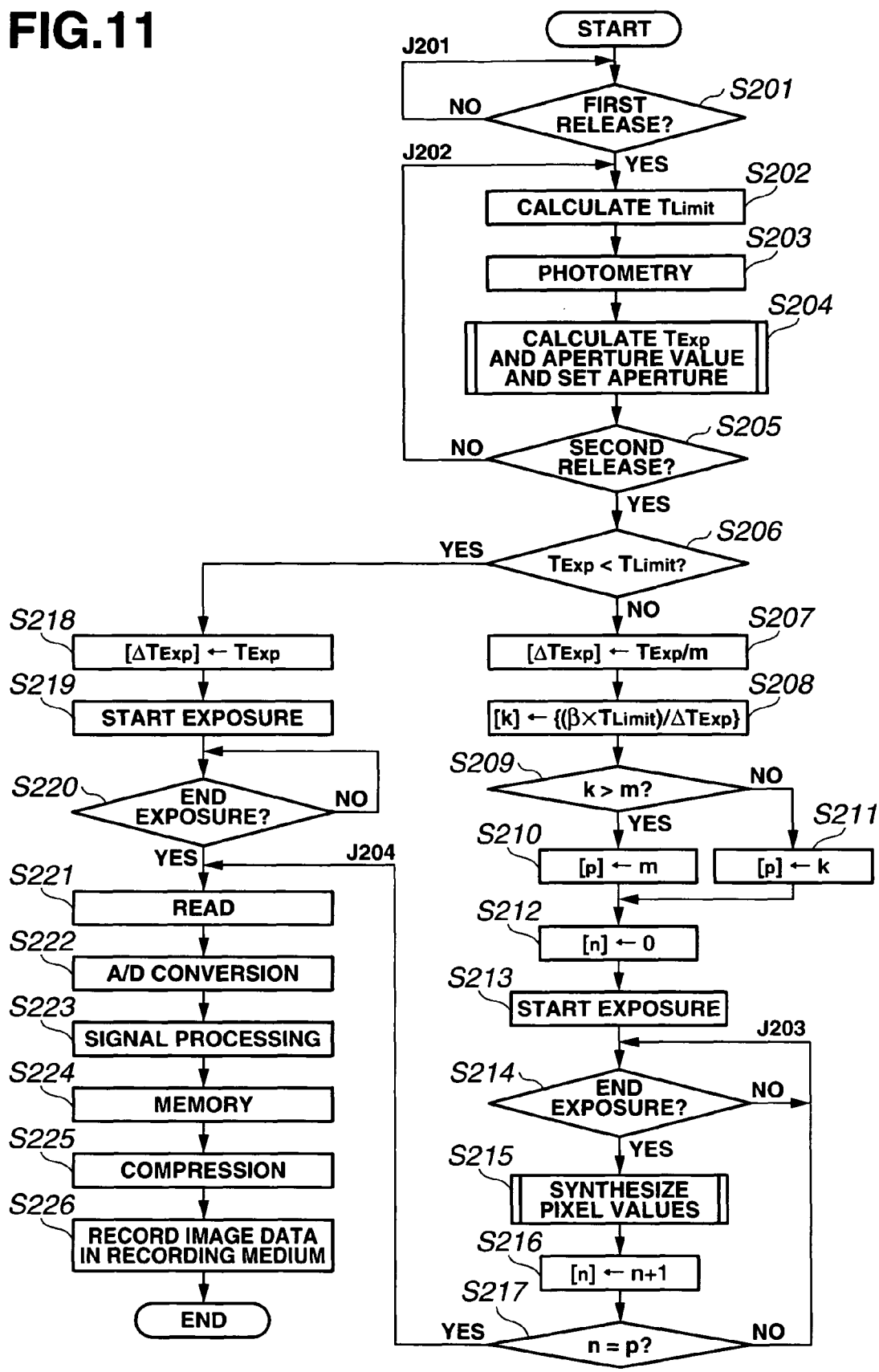
FIG. 11 is a flowchart showing another process example corresponding to the image pickup element of the second configuration example shown in FIG. 7 when an image is picked up and recorded by a digital camera according to the first embodiment.

Subsequently, FIG. 11 is a flowchart showing another process example corresponding to the image pickup element 1 of the second configuration example shown in FIG. 7 when an image is picked up by a digital camera. It should be noted that in FIG. 11, a description of a part in which the same process as that in FIG. 10 is performed is appropriately omitted while mentioning that effect.

The processes from Steps S201 to S207 are the same as those from Steps S101 to S107 in FIG. 10. It should be noted that in Step S201, when the first release switch 18a is not in the closed state, the jumping destination of the process is J201, and in Step S205, when the second release switch 18b is not in the closed state, the jumping destination of the process is J202.

Then, after the process in Step S207 is completed, next, $(\beta \times T_{Limit})/\Delta T_{Exp}$ is calculated, and the thus calculated value is stored in the memory [k] that stores the variable k (Step S208). β in the calculation formula is a previously set predetermined coefficient and $\beta \times T_{Limit}$ that is a numerator of the calculation formula represents the overall amount of blurring necessary for securing the effective area with the predetermined size or larger (hereinafter referred to as "allowable amount of blurring").

Herein the effective area means an area where all the time-division images are overlapped one another. Therefore, if this time-division shooting is performed by more than $\{(\beta \times T_{Limit})/\Delta T_{Exp}\}$ times for the exposure time $\Delta T_{Exp}$, the overall amount of blurring exceeds the allowable amount of blurring.

Then, it is determined whether or not a relation of k>m is established (Step S209).

Herein, when it is determined that the relation of k>m is established, that is, k is larger than the number of times m for performing the time-division shooting that is previously set as the initial value and when it is determined that the amount does not exceed the allowable amount of blurring even if this time-division shooting is performed by m times, m is stored in the memory [p] that stores the number of times for performing the time-division shooting (Step S210).

On the other hand, when it is determined that the relation of k>m is not established and when the number of times for performing the time-division shooting exceeds k times, this time-division shooting the overall amount of blurring exceeds the allowable amount of blurring and k is stored in the memory [p] (Step S211).

When the process in Step S210 or S211 is ended, next, the initial value 0 is stored in the memory [n] that stores the number of times for performing the time-division shooting (Step S212).

Then, the exposure is started (Step S213), and until the exposure time becomes $\Delta T_{Exp}$, the exposure is continued (Step S214).

Next, the pixel value synthesis is performed as in the process in Step S113 of FIG. 10 (Step S215) and n+1 is stored in the memory [n], whereby the number of times for performing the time-division shooting is incremented (Step S216).

Subsequently, it is determined whether or not the number of times for performing the time-division shooting [n] is p (Step S217), and when it is determined that the relation of n=p is not established, the process jumps to J203 and the time-division shooting and the pixel value synthesis are repeatedly performed as described above.

Then, in Step S217, when it is determined that the relation of n=p is established, the process jumps to J204 and the synthesized image stored in the horizontal transfer CCD 35 is transferred to the vertical transfer CCD 34 and then read out to the outside of the image pickup element 1 via the reading horizontal transfer CCD 37 (Step S221).

In Step S223 thereafter, the image read out from the image pickup element 1 is amplified by m/p times the normal amplification gain by the gain controller amplifier 3. Such amplification is conducted because in order to obtain the image at the appropriate level, this time-division shooting needs to be performed by m times, but the actual number of times for performing the time-division shooting is p, and the amplification needs to be performed in accordance with the number of times p.

Also, in Step S206, the processes in Steps S218 to S226 in the case where it is determined that the relation of $T_{Exp}<T_{Limit}$ is established are the same as those in Steps S116 to S124 of FIG. 10, and therefore the description thereof will be omitted.

As described in the above, in the process described with reference to FIG. 11, a value of β times the blurring limit exposure time $T_{Limit}$ obtained on the basis of empirical knowledge is defined as the allowable overall amount of blurring to secure an area equal to or larger than the previously set effective area, and the control is performed on the number of times for performing the time-division shooting so that the amount does not exceed the set amount of blurring. Therefore, there is a merit of facilitating the control as compared to the process described in FIG. 10 for determining whether or not the overall amount of blurring exceeds the allowable value through real time monitoring on the amount of blurring. Then, as the process shown in FIG. 11 is conducted, the provision of the angular rate sensors 19 and 20 and the A/D converters 21 and 22, etc. is unnecessary, whereby the configuration is also simplified.

It should be noted that in the above-mentioned flowcharts in FIGS. 10 and 11, the operations of the digital camera corresponding to the image pickup element 1 according to the second configuration example shown in FIG. 7 is described. Also, the operations of the digital camera corresponding to the image pickup element 1 according to the first configuration example shown in FIG. 6 is the same except that the pixel value synthesis process in step S113 of FIG. 10 is only replaced by the pixel value synthesis in the image pickup element 1 corresponding to FIG. 6 which has been already described.

According to the first embodiment, the amount of blurring from the firstly shot time-division image among the plurality of continuously shot time-division images is synthesized to a time-division image having the previously set amount of blurring within the predetermined amount range, whereby the synthesized image with the predetermined effective area can be generated. In this way, even for an unspecified number of photographers with different photographing skills, the image effective area can have a size equal to or larger than the predetermined size.

Then, when the signal level of the synthesized image does not reach the predetermined level, the synthesized image is amplified so as to reach the predetermined level, whereby it is possible to obtain the image with the appropriate exposure.

In addition, when the process shown in FIG. 11 is performed, the number of continuous shooting can be controlled without relying on a particular part such as an angular rate sensor for detecting the amount of blurring, whereby the configuration can be made simpler and also the control becomes easier.

Second Embodiment

FIGS. 14A to 14F and 15 show a second embodiment of the present invention. FIGS. 14A to 14F are timing charts for showing operations of the image pickup element 1. In the second embodiment, the same parts as those of the first embodiment are denoted by the same reference numerals and a description thereof will be omitted. Mainly, different points will be only described.

According to the second embodiment, the images obtained through the time-division shooting are read out from the image pickup element 1 and digitalized, and stored in the buffer memory 8a, and then the blurring compensation and the image synthesis are performed by the information processing section 8.

The electric configuration of this digital camera is basically substantially the same as that shown in FIG. 1, and with reference to FIG. 1 and the like, different points from the first embodiment will be only described.

First of all, in the second embodiment, the solid-state image pickup element 1 is not the image pickup element that can performed the blurring compensation described in the first embodiment but is a solid-state image pickup element used in a normal digital camera, for example, a CCD solid-state image pickup element. It should be noted that not only the CCD solid-state image pickup element but also a CMOS solid-state image pickup element or the like may be of course used.

The information processing section 8 includes the buffer memory 8a as described above. The buffer memory 8a is adapted to have a capacity with which a plurality of images obtained through this time-division shooting can be stored. Then, the information processing section 8 calculates to find out the amount of mutual blurring among the plurality of images obtained through this time-division shooting on the basis of the control of the CPU 7, and on the basis of the found amount of blurring the image process is performed to compensate the blurring of the plurality of images before synthesis. Herein, the information processing section 8 calculates the amount of blurring of the image on the basis of a few featured points in the image as will be described above. Therefore, the information processing section 8 doubles as the blurring detection section. In this way, according to the second embodiment, the angular rate sensors 19 and 20 and the A/D converters 21 and 22 shown in FIG. 1 may not be necessarily provided.

Next, operations of the digital camera according to this embodiment will be described. First of all, with reference to FIGS. 14A to 14F, operations of the image pickup element 1 will be described.

Figure 14:
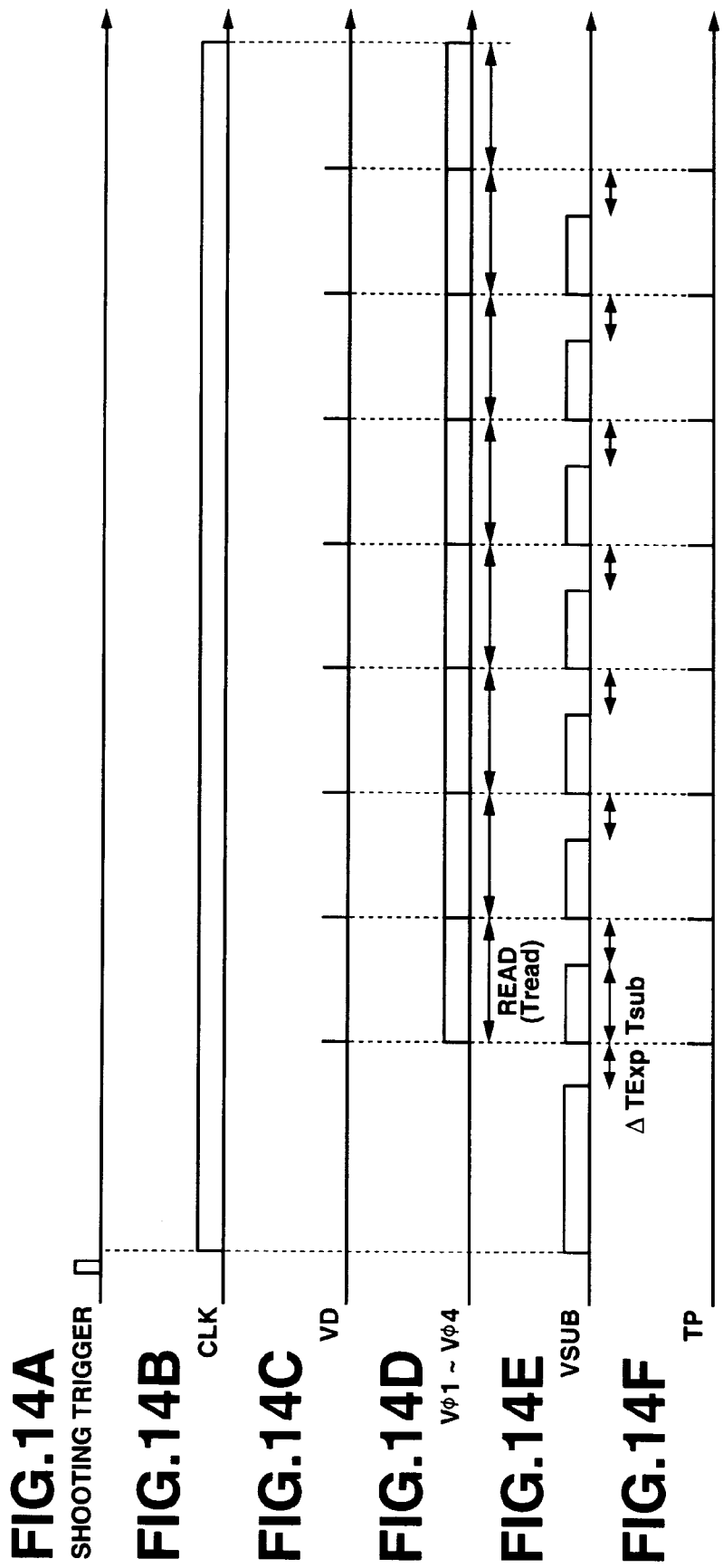
FIGS. 14A to 14F are timing charts showing operations of the image pickup element according to a second embodiment.

As shown in FIG. 14A, when a shooting trigger signal is generated as the second release switch 18b is in the closed state, a clock signal CLK is supplied from the timing generator 5 to the image pickup element 1 as shown in FIG. 14B.

The image pickup element 1 that receives the clock signal CLK is repeatedly applied with a substrate application high voltage pulse VSUB for forcedly releasing the charge accumulated at the photo diode that constitutes the pixel of the image pickup element 1 to a semiconductor substrate (substrate=vertical overflow drain VOFD) as shown in FIG. 14E. When the application of the high voltage pulse VSUB is ended, the exposure is started.

When the predetermined exposure time of the time-division shooting $\Delta T_{Exp}$ is ended, a shift pulse TP for shifting the charge at the photo diode of the image pickup element 1 to the vertical transfer CCD is outputted as shown in FIG. 14F. After that, in synchronism with a vertical synchronism signal VD shown in FIG. 14C, the respective transfer electrodes are applied with voltages V$\phi$1 to V$\phi$4 as shown in FIG. 14D, whereby the image is read out from the image pickup element 1.

In addition, in synchronism with the start of reading of the image from the image pickup element 1, as shown in FIG. 14E, the image pickup element 1 is applied again with VSUB for a predetermined application time Tsub.

When this VSUB application is ended, the exposure is started in a similar manner. After that, in synchronism with the next vertical synchronism signal VD shown in FIG. 14D, the reading of an image through the second time-division shooting is conducted.

The operations described above are performed by a predetermined number of times (for example, 10 times). Then, as is apparent from this description, a time obtained by subtracting the VSUB application time Tsub from a reading time Tread becomes the exposure time of the time-division shooting $\Delta T_{Exp}$.

The time-division image read out from the image pickup element 1 is subjected to reset noise removal by the CDS 2 and then analog signal amplification is performed by the gain controller amplifier (AMP) 3. Herein, the amplification gain of the gain controller amplifier (AMP) 3 is set to A1×A2 when an amplification gain in accordance with an ISO (International Organization for Standardization) sensitivity Sv is set as A1 and an amplification gain for making up the shortage amount of exposure for the image obtained through this time-division shooting is set as A2.

It should be noted that when the amount of exposure in the normal shooting is set as E1 and the amount of exposure obtained through this time-division shooting is set as B2, a relation of A2=E1/E2 is established. Furthermore, to be specific, when the exposure time for obtaining the appropriate exposure is set as $T_{Exp}$ and the time-division shooting is performed by m times due to the exposure time $T_{Exp}/m$ that is obtained by equally dividing the above-mentioned value by m times, $A2=T_{Exp}/(T_{Exp}/m)=m$ is established in each time-division shooting.

The amplified analog image signal amplified by the gain controller amplifier (AMP) 3 is converted into a digital signal by the A/D converter 4 in accordance with a signal supplied from the TG 5.

The image signal that is the digital signal converted by the A/D converter 4 is processed by the information processing section 8, thereby generating image data.

Figure 15:
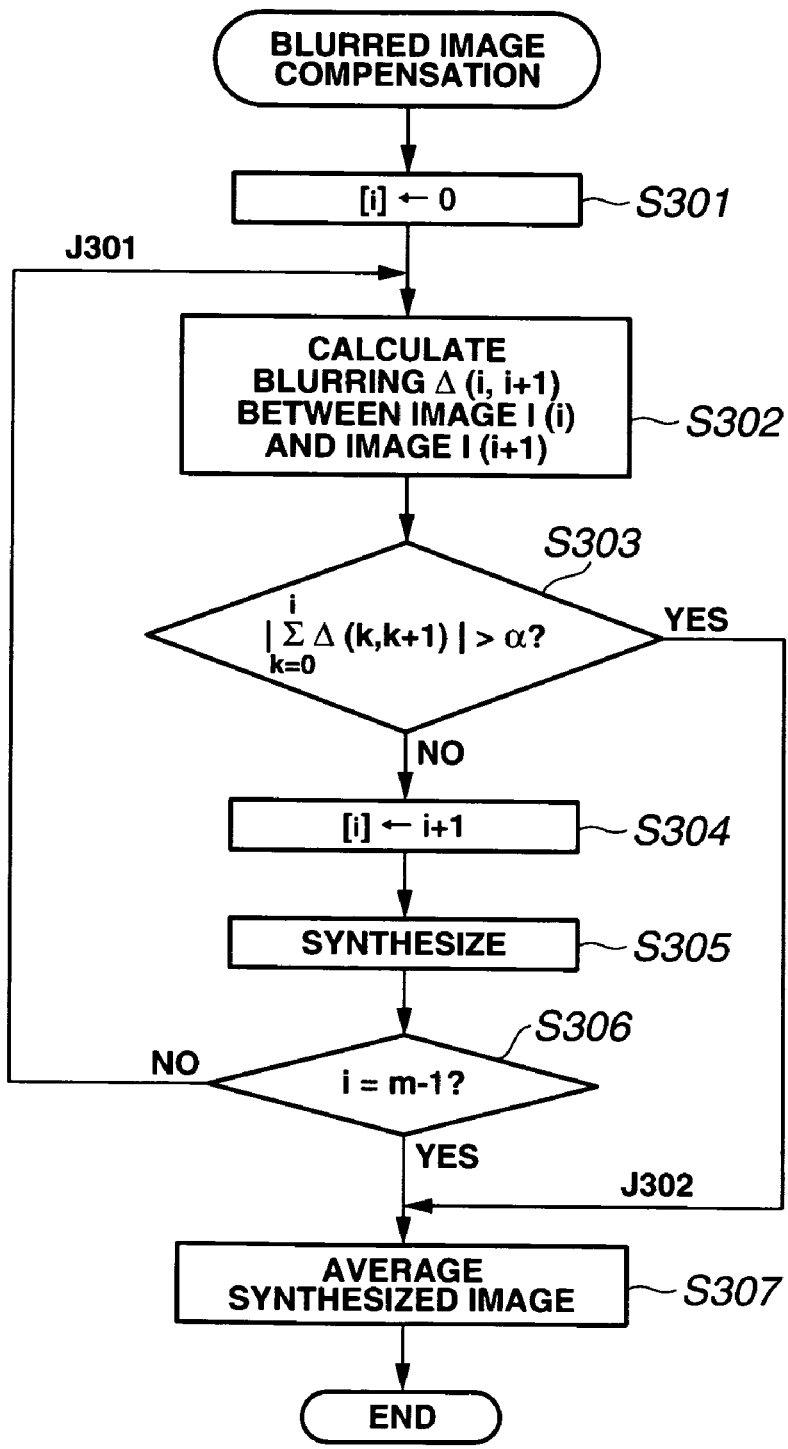
FIG. 15 is a flowchart showing a compensation process for a blurred image in an information processing section according to the second embodiment.

Next, FIG. 15 is a flowchart showing a compensation process for a blurred image in the information processing section 8.

When this process is started, first of all, as an initial setting, 0 is stored in the memory [i] for storing the variable i corresponding to an ID for identifying a time-division image (Step S301).

Next, a blurring $\Delta$ (i, i+1) between an image I (i) and an image I (i+1) is calculated (Step S302). The blurring $\Delta$ is found out by setting a few featured points in the image I (i) and performing a known motion vector calculation on featured points of the image I (i+1) which are identical to the above-mentioned featured points to obtain the relative deviation in the corresponding positions. It should be noted that the blurring $\Delta$ is a vector.

After that, a scalar value $|\Sigma\Delta(k, k+1)|$ of $\Sigma\Delta(k, k+1)$ subjected to integration (subsequent vector addition) of the blurring $\Delta$ (where k=0 to i) is calculated, and this value and a previously set predetermined value $\alpha$ are compared with each other (Step S303). Herein, when it is determined that the relation of $|\Sigma\Delta(k, k+1)|>\alpha$ is not established, the content of the memory [i] is incremented (Step S304).

Subsequently, on the basis of the blurring $\Delta$, the blurring between the image I (i) and the image I (i+1) is compensated, and thereafter the corresponding pixel values are added (synthesized) (Step S305).

Next, i and m−1 are compared with each other (Step S306). Herein, m denotes the number of times for performing the time-division shooting, that is, the number of pixels obtained through this time-division shooting. In Step S306, when it is determined that the relation of i=m−1 is not established, the process is branched to J301 where the above-mentioned processes are repeatedly performed.

On the other hand, in Step S306, when it is determined that the relation of i=m−1 is established, next, the average value of the synthesized images is calculated (Step S307).

In Step S303, when it is determined that the relation of |ΣΔ(k, k+1)|>α is established, the overall amount of blurring during this time-division shooting is determined to be larger than the allowable value (at which it is difficult to secure the effective area), the process is branched to J302, and the above-mentioned process in Step S307 is conducted. In this way, after the process in Step S307 is completed, this process is ended.

As described in the above, the information processing section 8 excludes from the synthesis process target a time-division image having the amount of blurring larger than a previously set predetermined value with the first shot time-division image as the reference so that an area where all time-division images are overlapped one another falls within a previously set effective area.

As regard to the time-division image having the amount of blurring within the predetermined value, the image in the previously set area is extracted from the first shot time-division image among the synthesized images. With this configuration, the extraction process for the effective area equal to or larger than the predetermined size can be easily conducted.

In this way, the image data of the effective area in which the blurring is compensated by the information processing section 8 is temporarily stored in the DRAM 9 and thereafter compressed into image data of a predetermined format such as JPEG by the compress/expand section 10 before being recorded in the recording medium 11.

It should be noted that in the above description, the blurring detection is performed on the basis of the featured points in the time-division image but the blurring detection may be of course performed on the basis of an output from an angular rate sensor or the like.

According to the second embodiment, substantially the same effects as those of the first embodiment are achieved and it is possible to generate the synthesized image in which the blurring is compensated on the basis of the time-division image within the predetermined amount of blurring among the time-division images read out from the image pickup element 1.

In addition, in the digital camera or the like that uses the normal image pickup element 1 without having the blurring compensation function as well, the blurring compensation can be conducted.

Furthermore, the blurring detection is performed on the basis of the featured points in the time-division image, whereby the provision of an angular rate sensor or the like is unnecessary and the configuration can be made simpler.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An electronic blurring compensation device for compensating blurring of a plurality of images shot in a time-division manner and synthesizing the compensated images, the device comprising:
a shooting section for continuously shooting a plurality of images based on a blurring exposure time in which blurring is allowable;
a control section for
obtaining a number k, where k is a number of times for shooting the plurality of images such that an area where all of the continuously shot images overlap one another has a size not smaller than a predetermined size set in advance, based on an exposure time obtained by multiplying a reciprocal of a focal length of a shooting lens by a predetermined coefficient set in advance and the blurring exposure time in which blurring is allowable, and
obtaining the plurality of images to be synthesized by performing shooting not more than k times;
a blurring compensation section for compensating mutual blurring of the plurality of images to be synthesized obtained by the control section; and
an image synthesize section for synthesizing the plurality of images compensated by the blurring compensation section.

2. The electronic blurring compensation device according to claim 1, wherein the control section performs shooting by a number of times m, which is obtained based on an exposure time for obtaining an appropriate exposure and the exposure time in which blurring is allowable, or the number of times k, whichever is smaller.

3. An electronic blurring compensation method for compensating blurring of a plurality of images shot in a time-division manner and synthesizing the compensated images, the method comprising:
continuously shooting by a shooting section a plurality of images based on a blurring exposure time in which blurring is allowable;
obtaining by a control section
a number k, where k is a number of times for shooting the plurality of images such that an area where all of the continuously shot images overlap one another has a size not smaller than a predetermined size set in advance, based on an exposure time obtained by multiplying a reciprocal of a focal length of a shooting lens by a predetermined coefficient set in advance and the blurring exposure time in which blurring is allowable, and
the plurality of images to be synthesized by performing shooting not more than k times;
compensating by a blurring compensation section mutual blurring of the plurality of images to be synthesized obtained by the control section; and
synthesizing by an image synthesize section the plurality of images compensated by the blurring compensation section.

4. An electronic blurring compensation device for compensating blurring of a plurality of images shot in a time-division manner, the device comprising:
a control section for determining, based on an exposure time obtained by multiplying a reciprocal of a focal length of a shooting lens by a predetermined coefficient set in advance and a blurring exposure time in which blurring is allowable, a number k, where k is a number of images to be continuously shot such that an area where all of the continuously shot images overlap one another has a size not smaller than a predetermined size set in advance;
a shooting section for continuously shooting a plurality of k or less images under control of the control section;
a blurring compensation section for compensating mutual blurring of the plurality of k or less images to be synthesized obtained by the control section; and
an image synthesis section for synthesizing the plurality of k or less images compensated by the blurring compensation section.

* * * * *